US010120382B2

(12) United States Patent
Ishijima et al.

(10) Patent No.: US 10,120,382 B2
(45) Date of Patent: Nov. 6, 2018

(54) WORK MACHINE, SYSTEM, METHOD, AND RECORDING MEDIUM RECORDING COMPUTER PROGRAM FOR DETERMINING AVAILABILITY OF ENTRY TO TRAVEL ROUTE, AND TRAVEL CONTROL SYSTEM OF WORK MACHINE

(71) Applicant: MAMIYA-OP CO., LTD., Tokyo (JP)

(72) Inventors: Seiichiro Ishijima, Yachiyo (JP); Tadashi Oshimi, Tokyo (JP); Kazutaka Yamamoto, Saitama (JP); Noboru Yazaki, Tokyo (JP); Hiroshi Sugawara, Tokyo (JP)

(73) Assignee: MAMIYA-OP CO., LTD., Tokyo (JP)

( * ) Notice: Subject to any disclaimer, the term of this patent is extended or adjusted under 35 U.S.C. 154(b) by 0 days.

(21) Appl. No.: 15/388,424

(22) Filed: Dec. 22, 2016

(65) Prior Publication Data
US 2017/0102702 A1    Apr. 13, 2017

Related U.S. Application Data

(60) Division of application No. 15/387,339, filed on Dec. 21, 2016, which is a continuation of application No. PCT/JP2015/054020, filed on Feb. 13, 2015.

(30) Foreign Application Priority Data

Jul. 4, 2014    (WO) .................. PCT/JP2014/067964
Oct. 1, 2014    (WO) .................. PCT/JP2014/076278

(51) Int. Cl.
*G05D 1/00*    (2006.01)
*G05D 1/02*    (2006.01)
(Continued)

(52) U.S. Cl.
CPC ......... *G05D 1/0088* (2013.01); *A01D 34/008* (2013.01); *G05D 1/027* (2013.01);
(Continued)

(58) Field of Classification Search
CPC .... G05D 1/0088; G05D 1/027; G05D 1/0278; G05D 2201/0201; A01D 34/008; A01D 2101/00
(Continued)

(56) References Cited

U.S. PATENT DOCUMENTS 9,072,219 B2 *  7/2015  Da Rocha ............ A01D 34/008
2013/0282224 A1  10/2013 Yazaki et al.

FOREIGN PATENT DOCUMENTS

JP     3318170 B2     8/2002
JP     3454666 B2    10/2003
JP   2013-228821 A   11/2013

OTHER PUBLICATIONS

International Search Report issued in PCT/JP2015/054020; dated May 19, 2015.
Written Opinion issued in PCT/JP2015/054020; dated May 19, 2015.

* cited by examiner

*Primary Examiner* — Gertrude Arthur Jeanglaude
(74) *Attorney, Agent, or Firm* — Studebaker & Brackett PC

(57) ABSTRACT

An entry availability determination system including a detector that detects a current position of a work machine that performs predetermined work while traveling a work target zone along a predetermined travel route; and a determination information generation unit that generates determination information indicating whether entry is possible by determining whether the work machine can enter from a current position for preparing entry of the work machine
(Continued)

only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route.

19 Claims, 14 Drawing Sheets

(51) Int. Cl.
  *A01D 34/00* (2006.01)
  *G01C 22/00* (2006.01)
  *A01D 101/00* (2006.01)
(52) U.S. Cl.
  CPC ....... *G05D 1/0278* (2013.01); *A01D 2101/00* (2013.01); *G05D 2201/0201* (2013.01)
(58) Field of Classification Search
  USPC .............................. 701/25, 26, 400, 408, 410
  See application file for complete search history.

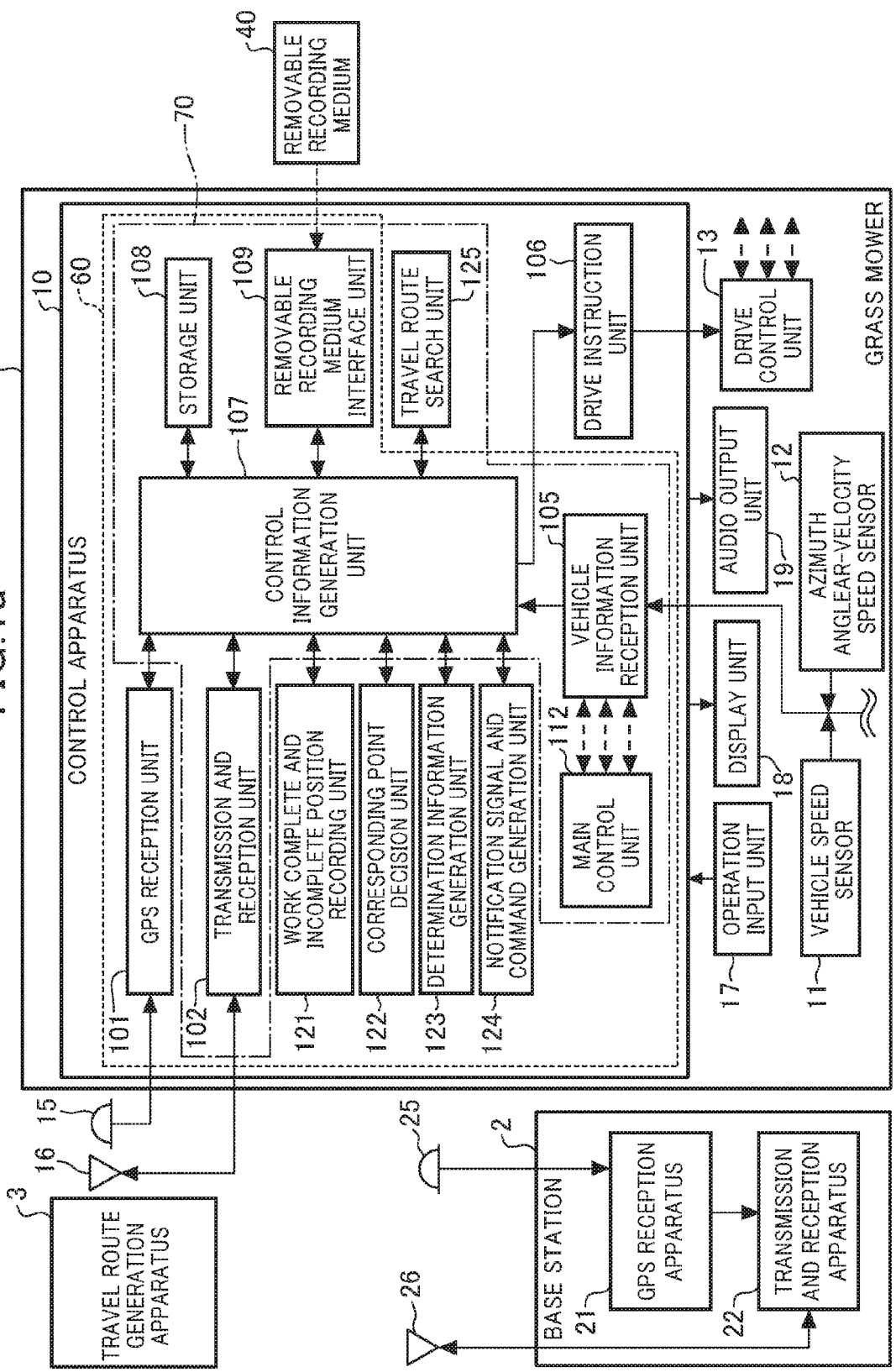

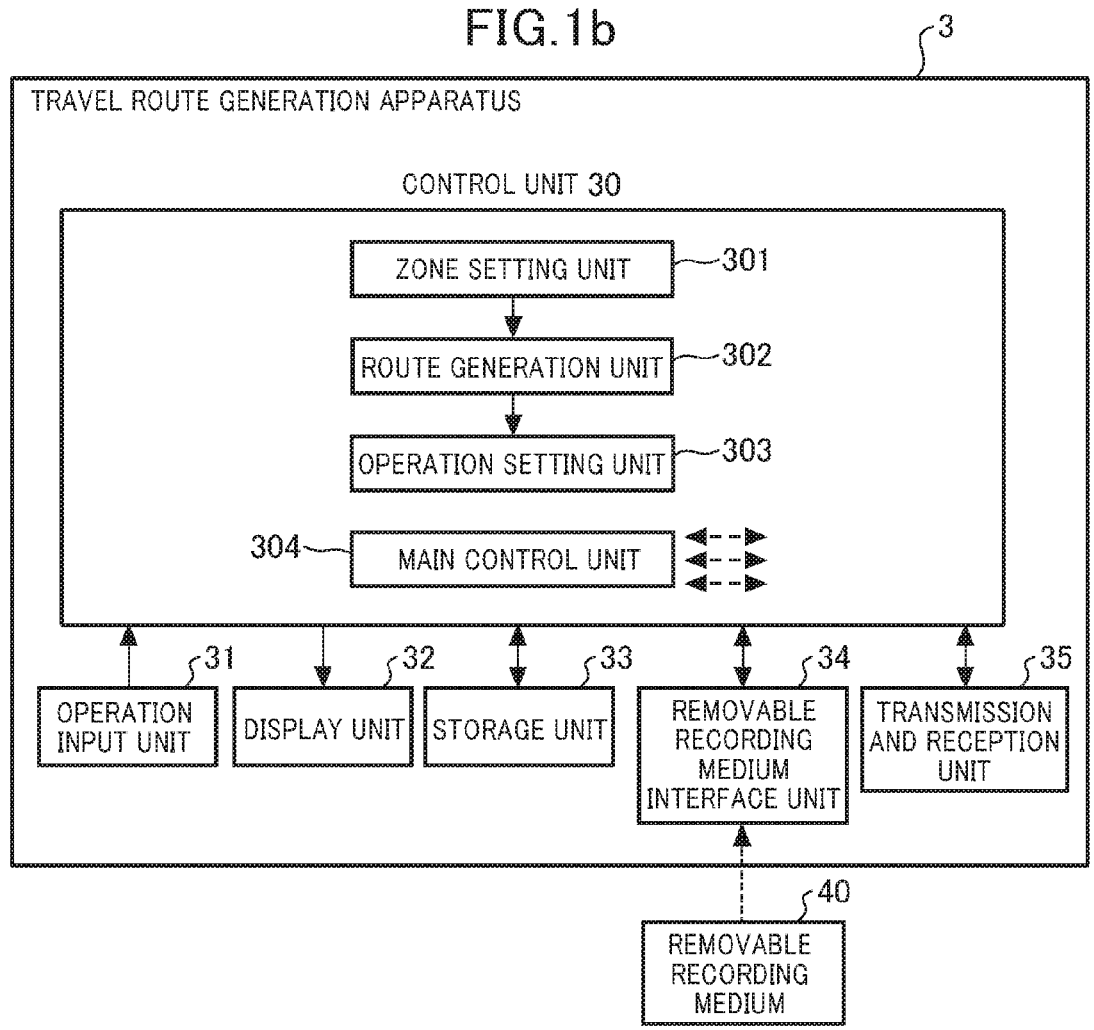

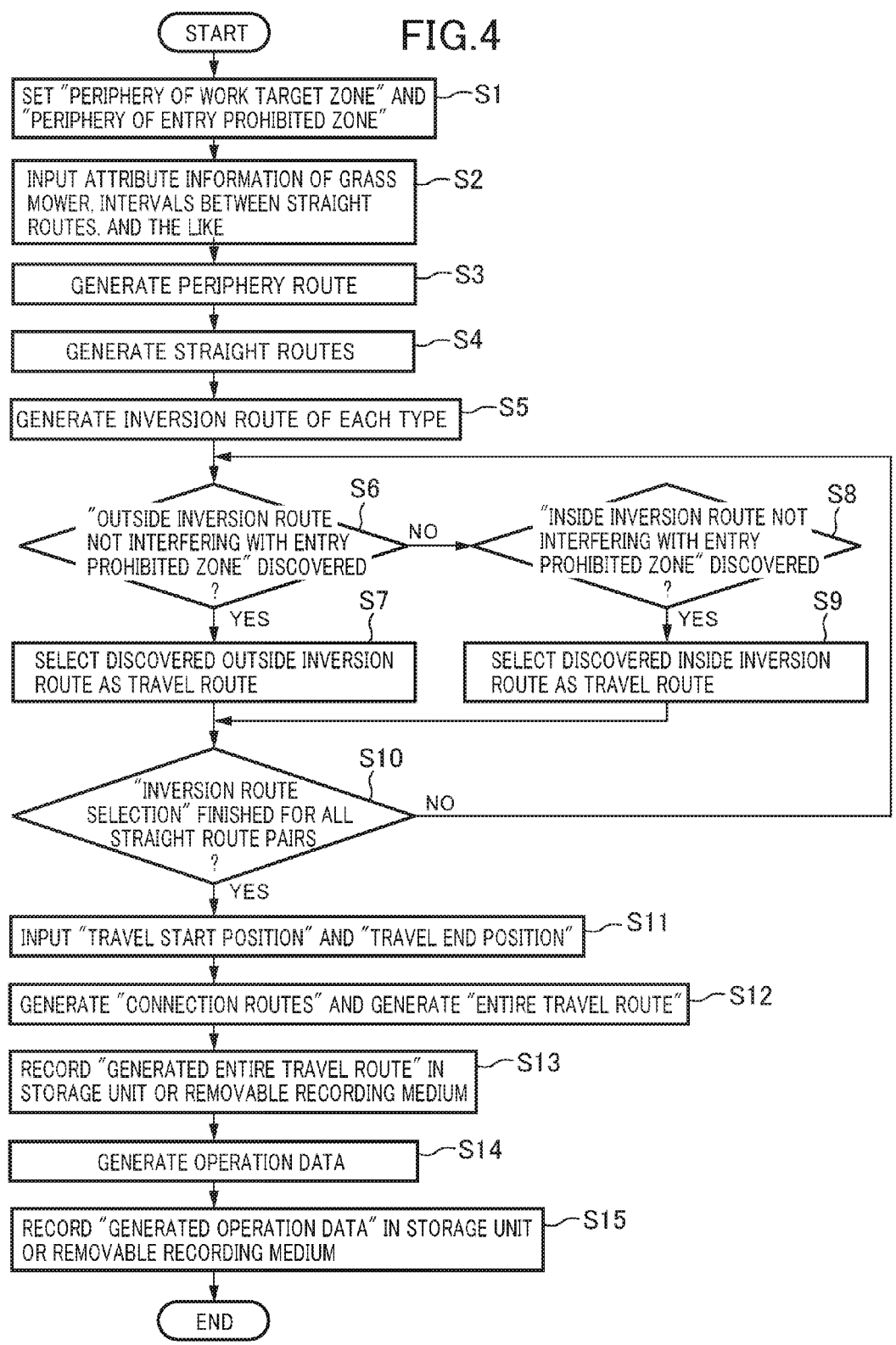

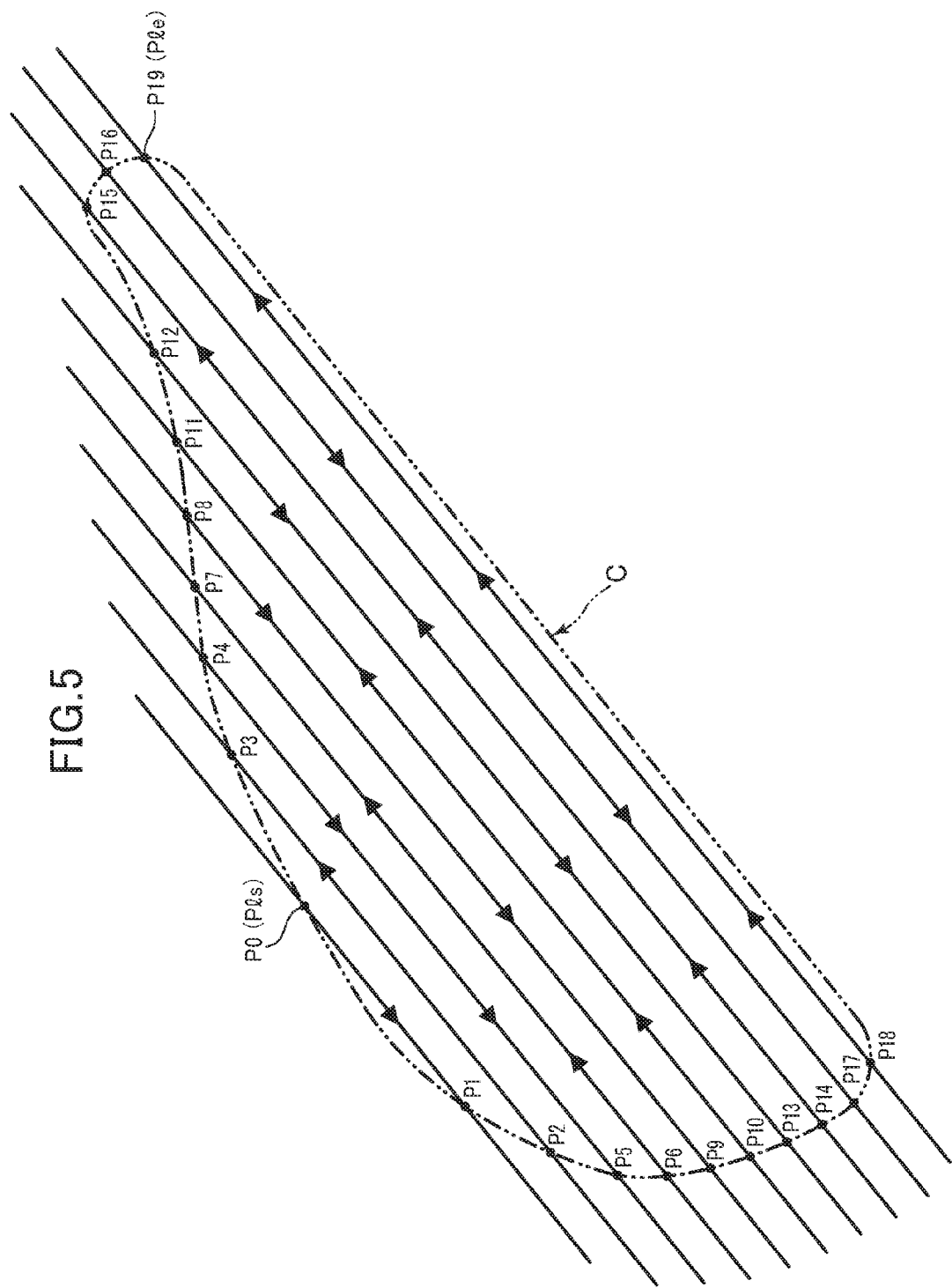

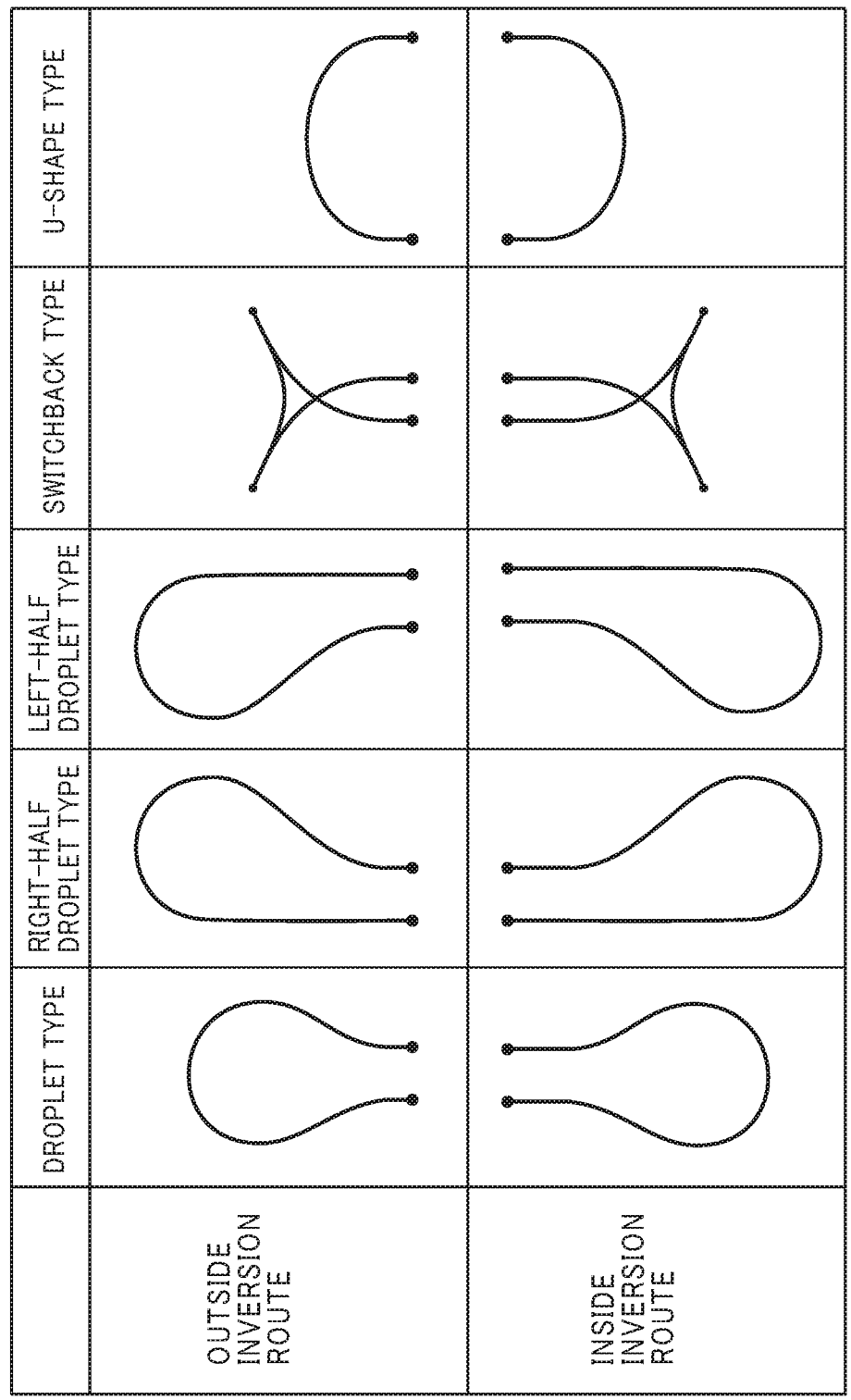

WORK MACHINE, SYSTEM, METHOD, AND RECORDING MEDIUM RECORDING COMPUTER PROGRAM FOR DETERMINING AVAILABILITY OF ENTRY TO TRAVEL ROUTE, AND TRAVEL CONTROL SYSTEM OF WORK MACHINE

CROSS-REFERENCE TO RELATED APPLICATIONS

This application is a Divisional Application of U.S. patent application Ser. No. 15/387,339 filed on Dec. 21, 2016, which is a Continuation Application of International Patent Application No. PCT/JP2015/054020 filed on Feb. 13, 2015, claims priority to and the benefit of International Patent Application Nos. PCT/JP2014/067964 filed on Jul. 4, 2014, and PCT/JP2014/076278 filed on Oct. 1, 2014, the entire contents of which are incorporated herein by reference.

TECHNICAL FIELD

The present invention relates to a work machine, such as farming machines and cleaning machines including, for example, a grass mower, a sprinkler, a spreader, a fertilizer distributor, a sower, a soil condition measuring machine, a harvester, a power tiller, a cultivator, and a leveling machine used in sports fields, such as a golf course and a soccer field, banks of rivers, parks, greenery, and gardens, an apparatus, a method, a program, and a recording medium recording the program for generating a travel route of the work machine, for determining availability of entry to the travel route, and for automatically selecting the travel route, and a travel control system of the work machine.

BACKGROUND ART

A self-propelled work machine is known, the work machine traveling a route formed by mutually linking, through inversion routes, ends of a plurality of straight routes parallel to each other, in a work target zone of work such as grass mowing, farming, and cleaning (for example, see Patent Literatures 1 and 2).

CITATION LIST

Patent Literature

Patent Literature 1: Japanese Patent No. 3318170
Patent Literature 2: Japanese Patent Laid-Open No. 2013-228821

SUMMARY OF INVENTION

Technical Problem

However, zones outside of the work target zone that prohibit the entry of the work machine (for example, zones prohibiting the entry due to the presence of cliffs, bunkers, rocks, trees, and the like, outside of greens or fairways (hereinafter, called "greens and the like") in grass mowing of a golf course) are not taken into account in the conventional work machine as described in Patent Literatures 1 and 2, and the work machine makes a turn outside of straight routes in the travel route.

In the travel route in which the work machine makes a turn outside of the straight routes, there may be an interference between the work machine traveling on the inversion route and the periphery of the entry prohibited zone depending on the positional relationship between the periphery of the work target zone and the periphery of the entry prohibited zone, such as when the periphery of the work target zone and the periphery of the entry prohibited zone are close to each other. Therefore, the turn operation needs to be started inside of the periphery of the work target zone to avoid this, and the actual work zone becomes smaller than the work target zone.

Thus, an object of the present invention is to generate a travel route of a work machine that enables the work throughout the entire work target zone regardless of the positional relationship between the periphery of the work target zone and the periphery of the entry prohibited zone, even if, for example, the periphery of the work target zone and the periphery of the entry prohibited zone are close to each other.

Another object of the present invention is automatic travel of the work machine in the generated travel route.

The work machine traveling the travel route for the work may stop traveling for some reason and get out of the travel route, such as when the work machine is retreated to use the work target zone before the end of the work in a work target zone, when the work machine is moved outside of the work target zone to inspect an abnormality of the work machine, and when the work machine needs to be urgently stopped to avoid an unexpected obstacle after detection of the obstacle during the travel for the work. In this case, the work machine needs to be returned to the travel route to restart the work at least from a final work complete position (hereinafter, also simply called "work complete position") of the time the work machine gets out of the travel route. Therefore, the user moves the work machine close to the work complete position. When a route in which the work is to be performed, a route in which the work is not to be performed, and a route in which the work is to be performed are connected, if the work of the previous route in which the work is to be performed is all complete, that is, if the work complete position of the time the work machine gets out of the travel route is a connection point of the previous route in which the work is to be performed and the route in which the work is not to be performed, it is only necessary that the work be restarted from the starting point of the subsequent route in which the work is to be performed (connection point of the route in which the work is not to be performed and the subsequent route in which the work is to be performed), that is, from the first work incomplete position of the time the work machine gets out of the travel route (hereinafter, also simply called "work incomplete position"). Therefore, the user may move the work machine close to the work incomplete position in such a case.

Meanwhile, in automatic travel, the work machine automatically travels the travel route based on a current position and a predetermined travel route. More specifically, the work machine travels along the predetermined travel route while correcting the track based on control such as feedback control and feedforward control. Therefore, once the work machine starts traveling from a position near the work complete position or the work incomplete position (hereinafter, also called "position for preparing entry"), the work machine enters the travel route while correcting the track to correct the difference between the current position and the travel route that the work machine is about to enter, and the work machine travels on the travel route. Therefore, the position on the travel route that the work machine actually enters the travel route cannot be controlled.

Thus, arranging the work machine for preparing entry so as to allow the work machine to enter the travel route only by forward movement in front of the work complete position or the work incomplete position requires a skill, and even a skilled person may fail the arrangement.

Therefore, an object of the present invention is to more surely arrange the work machine for preparing entry so as to allow the work machine to enter the travel route only by forward movement in front of the work complete position or the work incomplete position when the work machine gets out of the travel route.

When work is performed by using a work machine that performs predetermined work while automatically traveling along a predetermined travel route corresponding to each of one or a plurality of work target zones, movement to a work target zone or movement between work target zones may be performed by manual drive. In such a case, the user manually moves the work machine to near a travel route start position of one of the predetermined travel routes corresponding to the work target zones. In this case, the position near the travel route start position is a switch position between manual drive and automatic travel. Therefore, the user needs to arrange the work machine so that the work machine can enter at an entry position positioned between the travel route start position of each predetermined travel route and the work start position. The user also needs to select the predetermined travel route corresponding to the work zone in which the work will be performed.

Meanwhile, in automatic travel, the work machine automatically travels the travel route based on a current position and a predetermined travel route. More specifically, the work machine travels along the predetermined travel route while correcting the track based on control such as feedback control and feedforward control. Therefore, once the work machine starts traveling from a position near the travel route start position (hereinafter, also called "position for preparing entry"), the work machine enters the travel route while correcting the track to correct the difference between the current position and the travel route that the work machine is about to enter, then the work machine travels on the travel route. Therefore, the position on the travel route that the work machine actually enters the travel route cannot be controlled.

Thus, arranging the work machine for preparing entry so as to allow the work machine to enter the travel route only by forward movement in front of the work start position requires a skill, and even a skilled person may fail the arrangement.

Furthermore, the distinction between the predetermined travel routes corresponding to the respective work target zones may be difficult for an inexperienced user. It is burdensome for the user to select the travel route of the work target zone in which the work will be performed from the predetermined travel routes corresponding to the respective work target zones, and the user may make a mistake in selecting the travel route.

Therefore, automatic travel routes including the movement to the work target zone and the movement between work target zones can be prepared, and all of the travel can be automatic. However, in this case, the work sequence between the work zones cannot be changed. Therefore, when a work zone is in a work prohibition state, the work cannot be advanced until the work prohibition state is removed.

Thus, an object of the present invention is to enable flexibly changing the work sequence of the work target zones when the work is performed for a plurality of work target zones by using the work machine that performs the predetermined work while automatically traveling along the predetermined travel routes corresponding to the respective work target zones.

Another object of the present invention is to more surely arrange the work machine for preparing entry so as to allow the work machine to enter the travel route only by forward movement in front of the work start position, to eliminate the burden of selecting the travel route of the work zone in which the work will be performed, and to prevent making a mistake, when the work is performed for one or plurality of work target zones by using the work machine that performs predetermined work while automatically traveling along the predetermined travel routes corresponding to the respective work target zones, wherein the movement to the work target zone and the movement between the work target zones are performed by manual drive.

Solution to Problem

An aspect of the present invention provides a travel route generation system of generating a travel route of a work machine that performs predetermined work while traveling a route formed by linking ends of at least a plurality of substantially parallel routes through inversion routes in a work target zone, the ends being positioned at or near intersections of the routes and the periphery of the work target zone, the system including: a zone setting unit that sets a periphery of the work target zone and a periphery of an entry prohibited zone outside of the work target zone; and a route generation unit that selects, for each of the inversion routes, an inside inversion route for the work machine to enter the inversion route in an inside direction of the work target zone, not an outside inversion route for the work machine to enter the inversion route in an outside direction of the work target zone, according to a positional relationship between the periphery of the work target zone and the periphery of the entry prohibited zone, wherein the inside inversion route is selected as the travel route.

The route generation unit may select one of the inside inversion route and the outside inversion route as the travel route so that the work machine traveling each of the inversion routes does not interfere with the periphery of the entry prohibited zone.

The periphery of the work target zone and the periphery of the entry prohibited zone outside of the work target zone may be set based on data related to the periphery of the work target zone and the periphery of the entry prohibited zone outside of the work target zone obtained by measurement.

The plurality of substantially parallel routes may be straight routes.

An aspect of the present invention provides a work machine control system including: a storage unit that stores the travel route generated by the travel route generation system; detector that detects a behavior and a current position of the work machine that performs the predetermined work while traveling the work target zone; and controller that outputs a travel control signal for the work machine to travel the travel route based on at least the current position of the work machine traveling the work target zone and the travel route recorded in the storage unit to control a travel driving mechanism included in the work machine.

An aspect of the present invention is to provide a work machine including the work machine control system; and a travel driving mechanism that drives travel of the work machine based on the travel control signal output from the work machine control system.

An aspect of the present invention provides a travel route generation method of generating a travel route of a work machine that performs predetermined work while traveling a route formed by linking ends of at least a plurality of substantially parallel routes through inversion routes in a work target zone, the ends being positioned at or near intersections of the routes and the periphery of the work target zone, the method including the steps of; setting a periphery of the work target zone and a periphery of an entry prohibited zone outside of the work target zone; and selecting, for each of the inversion routes, an inside inversion route for the work machine to enter the inversion route in an inside direction of the work target zone, not an outside inversion route for the work machine to enter the inversion route in an outside direction of the work target zone, according to a positional relationship between the periphery of the work target zone and the periphery of the entry prohibited zone, wherein the inside inversion route is selected as the travel route.

In the step of selecting, one of the inside inversion route and the outside inversion route may be selected as the travel route so that the work machine traveling each of the inversion routes does not interfere with the periphery of the entry prohibited zone.

The periphery of the work target zone and the periphery of the entry prohibited zone outside of the work target zone may be set based on data related to the periphery of the work target zone and the periphery of the entry prohibited zone outside of the work target zone obtained by measurement.

The plurality of substantially parallel routes may be straight routes.

An aspect of the present invention provides a program for causing a computer to execute the travel route generation method.

An aspect of the present invention provides a computer-readable recording medium recording the program.

An aspect of the present invention provides an entry availability determination system including: detector that detects a current position of a work machine that performs predetermined work while traveling a work target zone along a predetermined travel route; and a determination information generation unit that generates determination information indicating whether entry is possible by determining whether the work machine can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route.

The determination information may be transmitted to an entry availability notification apparatus separate from the entry availability determination system.

The entry availability determination system may further include a notification signal and command generation unit that generates a signal and/or a command for instructing notification indicating that the entry is possible and/or the entry is impossible based on the determination information.

The determination information and/or the signal and/or the command for instructing notification indicating that the entry is possible and/or the entry is impossible may be output and/or transmitted to the entry availability notification apparatus separate from an entry availability determination system.

An aspect of the present invention provides an entry availability determination system for determining whether a work machine that performs predetermined work while traveling a work target zone along a predetermined travel route can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position on the travel route, when the work machine gets out of the travel route, the entry availability determination system including: detector that detects a current position and a direction of the work machine; a storage unit recording the travel route; a corresponding point decision unit that decides a corresponding point that is a point on the travel route recorded in the storage unit corresponding to the current position for preparing entry detected by the detector of the work machine; and a determination information generation unit that determines that the entry is impossible if a distance between the current position for preparing entry and the corresponding point is larger than a predetermined first value, and generates determination information indicating whether the entry is possible, wherein the predetermined first value is set in advance by considering at least steering performance of the work machine and a desired distance from a corresponding point to a point that the work machine enters the travel route.

The detector may further detect a direction of the work machine, and the determination information generation unit may determine that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and generate the determination information indicating whether the entry is possible.

The predetermined second value may be a predetermined value equal to or smaller than 30°.

The entry availability determination system may further include a work complete position recording unit that records the work complete position in the storage unit, wherein the determination information generation unit determines that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position.

An aspect of the present invention provides an entry availability determination system for determining whether a work machine that performs predetermined work while traveling a work target zone along a predetermined travel route cannot enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route, the entry availability determination system including: detector that detects a current position of the work machine; a storage unit recording the travel route; a corresponding point decision unit that decides a corresponding point that is a point on the travel route recorded in the storage unit corresponding to the current position for preparing entry detected by the detector of the work machine; and a determination information generation unit that determines that the entry is impossible if a distance between the current position for preparing entry and the corresponding point is larger than a predetermined first value, and generates determination information indicating whether the entry is possible, wherein the predetermined first value is set in advance by considering at least steering performance of the work machine and a desired distance from a corresponding point to a point that the work machine enters the travel route.

The detector may further detect a direction of the work machine, and the determination information generation unit may determine that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and generate the determination information indicating whether the entry is possible.

The predetermined second value may be a predetermined value equal to or smaller than 30°.

A work complete and incomplete position recording unit that records the work complete position and the work incomplete position in the storage unit may be further included, wherein the determination information generation unit determines that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position or the work incomplete position.

The corresponding point may be a nearest point that is a point on the travel route recorded in the storage unit nearest to the current position for preparing entry detected by the detector of the work machine.

The corresponding point may be a work complete side nearest point that is a point on the travel route recorded in the storage unit nearest to the current position for preparing entry detected by the detector of the work machine, on the opposite side of the traveling direction of the work machine with respect to the work complete position or the work incomplete position.

The entry availability determination system may further include a notification signal and command generation unit that generates a signal and/or a command for instructing notification indicating that the entry is possible and/or the entry is impossible based on the determination information.

The determination information may be transmitted to an entry availability notification apparatus separate from the entry availability determination system.

The determination information and/or the signal and/or the command for instructing notification indicating that the entry is possible and/or the entry is impossible may be output and/or transmitted to an entry availability notification apparatus separate from the entry availability determination system.

A signal for instructing the work machine to start entering by automatic travel may be generated if content of the determination information indicates that the entry is possible.

An aspect of the present invention provides a work machine control system including: controller that controls a travel driving mechanism included in the work machine by outputting a travel control signal for the work machine to travel the travel route based on at least the current position of the work machine that travels the work target zone and the travel route recorded in the storage unit; and the entry availability determination system.

An aspect of the present invention provides a work machine including a travel driving mechanism that drives travel of the work machine based on the travel control signal output from the work machine control system.

An aspect of the present invention provides an entry availability determination method including the steps of detecting a current position of a work machine that performs predetermined work while traveling a work target zone along a predetermined travel route; and generating determination information indicating whether entry is possible by determining whether the work machine can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route.

The determination information may be transmitted to an entry availability notification apparatus.

The entry availability determination method may further include a step of generating a signal and/or a command for instructing notification indicating that the entry is possible and/or the entry is impossible based on the determination information.

The determination information and/or the signal and/or the command for instructing notification indicating that the entry is possible and/or the entry is impossible can be output and/or transmitted to an entry availability notification apparatus.

An aspect of the present invention provides an entry availability determination method of determining whether a work machine that performs predetermined work while traveling a work target zone along a predetermined travel route can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position on the travel route, when the work machine gets out of the travel route, the entry availability determination method including the steps of detecting a current position and a direction of the work machine; deciding a corresponding point that is a point on the travel route corresponding to the current position for preparing entry detected by the step of detecting the current position of the work machine; and determining that the entry is impossible if a distance between the current position for preparing entry and the corresponding point is larger than a predetermined first value, and generating determination information indicating whether the entry is possible, wherein the predetermined first value is set in advance by considering at least steering performance of the work machine and a distance from a desired corresponding point to a point that the work machine enters the travel route.

In the step of detecting, a direction of the work machine may be further detected, and in the step of generating the determination information, it may be determined that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and the determination information indicating whether the entry is possible may be generated.

The predetermined second value may be a predetermined value equal to or smaller than 30°.

The entry availability determination method may further include: recording the work complete position; and determining that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position.

An aspect of the present invention provides an entry availability determination method of determining whether a work machine that performs predetermined work while traveling a work target zone along a predetermined travel route cannot enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route, the entry availability determination method including the steps of detecting a current position of the work machine; deciding a corresponding point that is a point on the travel route corresponding to the current position for preparing entry detected by the step of detecting the current position of the work machine; and determining that the entry is impossible if a distance between the current position for preparing entry and the corresponding point is larger than a predetermined first value, and generating determination information indicating whether the entry is possible, wherein the predetermined first value is set in advance by considering at least steering performance of the work machine and a desired distance from a corresponding point to a point that the work machine enters the travel route.

In the step of detecting, a direction of the work machine may be further detected, and in the step of generating the determination information, it may be determined that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and the determination information indicating whether the entry is possible can be generated.

The predetermined second value may be a predetermined value equal to or smaller than 30°.

A step of recording the work complete position and the work complete position and a step of determining that the entry is impossible if a point at a distance of a third value, which is set by considering a margin distance of the distance from the desired corresponding point to the point that the work machine enters the travel route, in the traveling direction of the work machine in the travel route is positioned on the side of the traveling direction of the work machine with respect to the work complete position or the work incomplete position can be further included.

The corresponding point may be a nearest point that is a point on the travel route nearest to the current position for preparing entry detected by the detector of the work machine.

The corresponding point may be a work complete side nearest point that is a point on the travel route recorded in the storage unit nearest to the current position for preparing entry detected by the detector of the work machine, on the opposite side of the traveling direction of the work machine with respect to the work complete position or the work incomplete position.

The entry availability determination method may further include a step of generating a signal and/or a command for instructing notification indicating that the entry is possible and/or the entry is impossible based on the determination information.

The determination information may be transmitted to an entry availability notification apparatus.

The determination information and/or the signal and/or the command for instructing notification indicating that the entry is possible and/or the entry is impossible may be output and/or transmitted to an entry availability notification apparatus.

A signal for instructing the work machine to start entering by automatic travel may be generated if content of the determination information indicates that the entry is possible.

An aspect of the present invention provides a program for causing a computer to execute the entry availability determination method.

An aspect of the present invention provides a computer-readable recording medium recording the program.

An aspect of the present invention provides a travel route automatic selection system for a work machine that, for each of one or a plurality of work target zones, performs predetermined work while automatically traveling along a predetermined travel route corresponding to each of the one or a plurality of work target zones, the travel route automatic selection system including: a storage unit that, for the predetermined travel route corresponding to each of the one or plurality of work target zones, records a travel route part of a predetermined distance from a travel route start position at least between the travel route start position and a work start position; current position acquirer that acquires a current position of the work machine; and a travel route search unit that searches a travel route satisfying a condition that the work machine can enter from a current position for preparing entry of the work machine only by forward movement along an entry route formed so that the work machine enters at an entry position in a same direction as a traveling direction when the work machine travels the travel route, at the entry position positioned between the travel route start position and the work start position, from the predetermined travel route corresponding to each of the one or a plurality of work target zones, by determining whether the condition is satisfied based on at least the travel route part of the predetermined distance from the travel route start position at least between the travel route start position and the work start position of the predetermined travel route corresponding to each of the one or a plurality of work target zones recorded in the storage unit.

The travel route search unit may decide each corresponding point that is a point on the travel route parts corresponding to the current position for preparing entry acquired by the current position acquirer, for the travel route part at the predetermined distance from the travel route start position at least between the travel route start position and the work start position of the predetermined travel route corresponding to each of the one or a plurality of work target zones recorded in the storage unit, and determine for each of the travel route parts that the condition is not satisfied if the distance between the current position for preparing entry and the corresponding point is larger than a predetermined first value, and the predetermined first value is set in advance by considering at least steering performance of the work machine and a desired distance from the corresponding point to a point that the work machine enters the travel route.

The travel route search unit may determine that the condition is not satisfied if a point at a distance of a third value which is set by considering a margin distance of a desired distance from the corresponding point to the point that the work machine enters the travel route, from the corresponding point in the traveling direction of the work machine in the travel route, is positioned on the side of the traveling direction of the work machine with respect to the work start position.

The travel route automatic selection system may further include azimuth acquirer that acquires a direction of the work machine, wherein the travel route search unit determines that the condition is not satisfied if an absolute value of an angle of the direction of the work machine with respect to a direction of a tangent line at the corresponding point on the travel route is larger than a predetermined second value.

The recording unit may, for the predetermined travel route corresponding to each of the one or a plurality of work target zones, record a travel start possible area including the travel route part at the predetermined distance from the travel route start position between the travel route start position and the work start position, or the travel route search unit may generate a travel start possible area based on the travel route part, and for each of one or a plurality of travel start possible areas, the travel route search unit may search the travel route satisfying the condition from the predetermined travel route corresponding to each of the one or a plurality of work target zones based on whether the current position of the work machine is in the travel start possible area.

The travel start possible area may have a width of the predetermined first value on both sides of the travel route part with respect to the travel route part.

The travel start possible area may have a length at least twice as much as a maximum estimated amount of a difference from a target position in manual drive of the work machine.

The travel route part may be a straight line.

The travel start possible area may be a rectangle.

The travel route automatic selection system may further include azimuth acquirer that acquires a direction of the work machine, wherein for the travel route part at the predetermined distance from the travel route start position at least between the travel route start position and the work start position of the predetermined travel route corresponding to each of the one or a plurality of work target zones recorded in the storage unit, the travel route search unit may decide each corresponding point that is a point on the travel route part corresponding to the current position for preparing entry acquired by the current position acquirer and may determine for each of the travel routes that the condition is not satisfied if the absolute value of the angle of the direction of the work machine with respect to the direction of the tangent line at the corresponding point is larger than the predetermined second value.

The travel route automatic selection system may further include azimuth acquirer that acquires a direction of the work machine, wherein for each of the travel route parts, the travel route search unit may determine that the condition is not satisfied if the absolute value of the angle of the direction of the work machine with respect to the direction of the travel route part is larger than the predetermined second value.

The predetermined second value may be a predetermined value equal to or smaller than 30°.

There may be a plurality of the predetermined travel routes corresponding to each of at least one work target zone of the one or a plurality of work target zones, and two travel routes in different directions from the travel route start position to the work start position may be included.

If the travel route satisfying the condition is discovered, the travel route search unit may generate information for identifying the travel route satisfying the condition and a signal and/or a command for instructing notification indicating that the work machine is at a position in which entry to the travel route is possible.

If the travel route satisfying the condition is discovered, the travel route search unit may further generate a signal and/or a command for instructing notification of a request for inputting an automatic drive start instruction.

The notification of the request for inputting the automatic drive start instruction may be performed after determining that a user is not on the work machine.

If the travel route satisfying the condition is discovered, the travel route search unit may further generate a signal and/or a command for instructing notification of information related to the travel route satisfying the condition.

The storage unit may record a work history of each of the one or a plurality of work target zones.

The information related to the travel route satisfying the condition may be the work history of the work target zone of the travel route satisfying the condition or information obtained from the work history.

There may be a plurality of the predetermined travel routes corresponding to each of at least one work target zone of the one or a plurality of work target zones, at least two of the plurality of predetermined travel routes can include travel routes in which the travel route parts at the predetermined distance from the travel route start positions are the same and the travel routes in the work target zones are different, and one travel route may be selected from the at least two of the plurality of predetermined travel routes searched by the travel route search unit based on a predetermined selection condition.

An aspect of the present invention provides a work machine control system including: the travel route automatic selection system; and controller that controls a travel driving mechanism included in the work machine by outputting a travel control signal for the work machine to travel the travel route based on at least the current position of the work machine traveling in the work target zone and the travel route satisfying the condition discovered by the travel route search unit.

An aspect of the present invention provides a work machine including a travel driving mechanism that drives travel of the work machine based on the travel control signal output from the work machine control system.

An aspect of the present invention provides a travel route automatic selection method for a work machine that, for each of one or a plurality of work target zones, performs predetermined work while automatically traveling along a predetermined travel route corresponding to each of the one or a plurality of work target zones, the travel route automatic selection method including the steps of recording, in a storage unit, for each of one or a plurality of work target zones, a travel route part of a predetermined distance from travel route start position at least between the travel route start position and work start position in the predetermined travel route corresponding to each of the one or a plurality of work target zones; acquiring a current position of the work machine; and searching a travel route satisfying a condition that the work machine can enter from a current position for preparing entry of the work machine only by forward movement along an entry route formed so that the work machine enters at an entry position in a same direction as a traveling direction when the work machine travels the travel route, at the entry position positioned between the travel route start position and the work start position, from the predetermined travel route corresponding to each of the one or a plurality of work target zones, by determining whether the condition is satisfied based on at least the travel route part of the predetermined distance from the travel route start position at least between the travel route start position and the work start position of the predetermined travel route corresponding to each of the one or a plurality of work target zones recorded in the storage unit.

The travel route automatic selection method may further include a step of deciding each corresponding point that is a point on the travel route part corresponding to the current position for preparing entry acquired in the step of acquiring the current position of the work machine, for the travel route part of the predetermined distance from the travel route start position at least between the travel route start position and the work start position of the predetermined travel route corresponding to each of the one or a plurality of work target zones recorded in the storage unit, and determining for each of the travel route parts that the condition is not satisfied if the distance between the current position for preparing entry and the corresponding point is larger than a predetermined first value, wherein the predetermined first value is set in advance by considering at least steering performance of the work machine and a desired distance from the corresponding point to a point that the work machine enters the travel route.

The travel route automatic selection method may further include a step of determining that the condition is not satisfied if a point at a distance of a third value which is set by considering a margin distance of a desired distance from the corresponding point to the point that the work machine enters the travel route, from the corresponding point in the traveling direction of the work machine in the travel route, is positioned on the side of the traveling direction of the work machine with respect to the work start position.

The travel route automatic selection method may further include the steps of; acquiring a direction of the work machine; and a step of determining that the condition is not satisfied if an absolute value of an angle of the direction of the work machine with respect to a direction of a tangent line at the corresponding point on the travel route is larger than a predetermined second value.

The recording unit may, for the predetermined travel route corresponding to each of the one or a plurality of work target zones, record a travel start possible area including the travel route part at the predetermined distance from the travel route start position between the travel route start position and the work start position in the predetermined travel route corresponding to each of the one or a plurality of work target zones, and the travel route automatic selection method may further include a step of searching, for each of one of a plurality of travel start possible areas, the travel route satisfying the condition from the predetermined travel route corresponding to each of the one or a plurality of work target zones based on whether the current position of the work machine is in the travel start possible area.

The travel route automatic selection method may further include the steps of: generating a travel start possible area based on the travel route part in the predetermined travel routes corresponding to each of the one or a plurality of work target zones; and searching, for each of one or a plurality of travel start possible areas, the travel route satisfying the condition from the predetermined travel route corresponding to each of the one or a plurality of work target zones based on whether the current position of the work machine is in the travel start possible area.

The travel start possible area may have a width of the predetermined first value on both sides of the travel route part with respect to the travel route part.

The travel start possible area may have a length at least twice as much as a maximum estimated amount of a difference from a target position in manual drive of the work machine.

The travel route part may be a straight line.

The travel start possible area may be a rectangle.

The travel route automatic selection method may further include the steps of: acquiring a direction of the work machine; deciding, for the travel route part at the predetermined distance from the travel route start position at least between the travel route start position and the work start position of the predetermined travel route corresponding to each of the one or a plurality of work target zones recorded in the storage unit, each corresponding point that is a point on the travel route part corresponding to the current position for preparing entry acquired in the step of acquiring the current position of the work machine and determining for each of the travel routes that the condition is not satisfied if the absolute value of the angle of the direction of the work machine with respect to the direction of the tangent line at the corresponding point is larger than the predetermined second value.

The travel route automatic selection method may further include the steps of; acquiring a direction of the work machine; and determining, for each of the travel route parts, that the condition is not satisfied if the absolute value of the angle of the direction of the work machine with respect to the direction of the travel route part is larger than the predetermined second value.

The predetermined second value may be a predetermined value equal to or smaller than 30°.

There may be a plurality of the predetermined travel routes corresponding to each of at least one work target zone of the one or a plurality of work target zones, and two travel routes in different directions from the travel route start position to the work start position can be included.

In the step of searching, if the travel route satisfying the condition is discovered, information for identifying the travel route satisfying the condition and a signal and/or a command for instructing notification indicating that the work machine is at a position in which entry to the travel route is possible may be generated.

In the step of searching, if the travel route satisfying the condition is discovered, a signal and/or a command for instructing notification of a request for inputting an automatic drive start instruction may be further generated.

The notification of the request for inputting the automatic drive start instruction may be performed after determining that a user is not on the work machine.

In the step of searching, if the travel route satisfying the condition is discovered, a signal and/or a command for instructing notification of information related to the travel route satisfying the condition may be further generated.

The storage unit may record a work history of each of the one or a plurality of work target zones.

The information related to the travel route satisfying the condition may be the work history of the work target zone of the travel route satisfying the condition or information obtained from the work history.

There may be a plurality of the predetermined travel routes corresponding to each of at least one work target zone of the one or a plurality of work target zones, at least two of the plurality of predetermined travel routes can include travel routes in which the travel route parts at the predetermined distance from the travel route start positions are the same and the travel routes in the work target zones are different, and one travel route can be selected from the at least two of the plurality of predetermined travel routes searched in the step of searching based on a predetermined selection condition.

An aspect of the present invention provides a program for causing a computer to execute the travel route automatic selection method.

An aspect of the present invention provides a computer-readable recording medium recording the program.

In the present description and the claims, the "work complete position" and the "work incomplete position" denote a final work complete position and a first work incomplete position, respectively, when the work machine gets out of the travel route.

In the present description and the claims, the "corresponding point" denotes a corresponding point on the travel route obtained by considering which point on the travel route corresponds to the current position for preparing entry if the work machine travels without departing from a predetermined travel route, assuming that the current position for preparing entry is a position positioned as a result of the departure from the predetermined travel route.

In the present description and the claims, the "work start position" denotes a position in which the work machine starts working for the first time in a predetermined travel route corresponding to each of one or a plurality of work target zones.

Advantageous Effects of Invention

According to the present invention with the configuration, the work sequence of work target zones can be flexibly changed when a work machine that performs predetermined work while automatically traveling along a predetermined travel route corresponding to each of a plurality of work target zones is used to perform the work.

According to the present invention with the configuration, when a work machine that performs predetermined work while automatically traveling along a predetermined travel route corresponding to each of one or a plurality of work target zones is used to perform the work, and the movement to the work target zone or the movement between the work target zones are performed by manual drive, the arrangement of the work machine for preparing entry so as to allow the work machine to enter the travel route only by forward movement on the near side of the work start position can be more surely performed. The burden of selecting the travel route of the work zone in which the work will be performed can be eliminated, and a mistake can be prevented.

BRIEF DESCRIPTION OF DRAWINGS

FIG. 1a is a general outline view of apparatuses necessary for grass mowing work.

FIG. 1b is a general outline view of apparatuses necessary for the grass mowing work.

FIG. 4 is a flow chart of a travel route generation process.

FIG. 5 is a view for explaining setting of straight routes.

FIG. 6 is a view for explaining types of inversion routes.

DESCRIPTION OF EMBODIMENTS

Figure 2A:
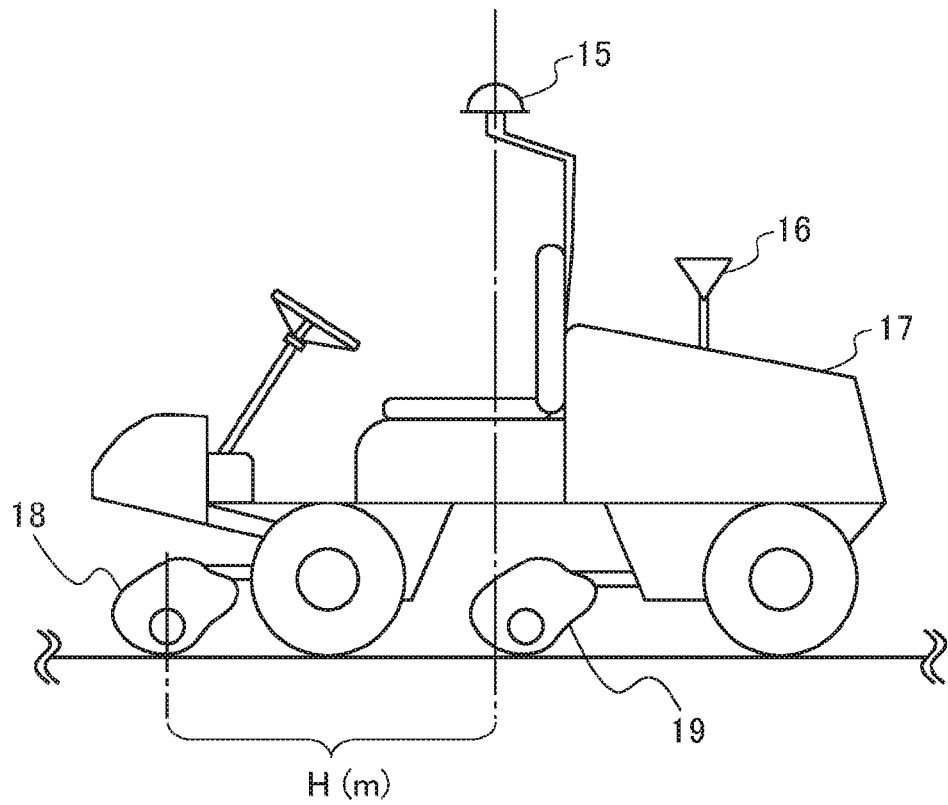
FIG. 2(a) is a side external view of a grass mower applying the present invention.

Hereinafter, embodiments will be described, in which a work machine of the present invention, an apparatus, a method, and a program for determining availability of the work machine to enter a travel route, a recording medium recording the program, and a travel control apparatus of the work machine are applied to a grass mower that mows grass of a golf course. A general grass mower is designated to perform grass mowing work while moving forward. To mow the grass, such as greens, of a golf course, it is desirable to cause the grass mower to systematically perform the grass mowing work so that the grains of grass of adjacent lines after linearly mowing the grass are in opposite directions. It is also desirable to perform the grass mowing work so that the boundaries between the greens and the like and the rough are as smooth as possible.

Therefore, the present embodiment describes an example of causing the grass mower to travel a periphery route for mowing the grass around the green or the like that is a grass mowing target zone and substantially parallel straight routes linked to each other through inversion routes for systematically mowing the grass of the green or the like, and to perform the grass mowing work in the respective routes. Here, the present embodiment describes an example in which adjacent straight routes are linked through the inversion routes and forms a route, and the grass mower sequentially travels adjacent straight routes in opposite directions. However, as shown for example in Japanese Patent No. 3454666, a route (hereinafter, also called "skip route") formed by linking a straight route to a straight route skipping some adjacent straight routes through an inversion route may be part or all of the travel route. In place of the substantially parallel straight routes, the routes may be substantially parallel curved routes.

Although whether to start the grass mowing work in the periphery route after the end of the work in the straight routes or to perform the grass mowing work in the periphery route first can be arbitrarily determined, an example of the former will be described in the present embodiment.

General Outline

FIGS. 1(a) and 1(b) show a general outline of apparatuses necessary for grass mowing work. In the present embodiment, an example of a grass mower 1 is illustrated that performs grass mowing work of a golf course while measuring the current position using an RTK-GPS (Real Time Kinematic GPS: interferometric positioning system).

A base station 2 includes: a GPS reception apparatus 21 and a transmission and reception apparatus 22 equivalent to reference stations of RTK-GPS; a GPS antenna 25; and a communication antenna 26. The base station 2 is installed on a spot in which the longitude, the latitude, and the altitude are already known. The GPS reception apparatus 21 generates correction information for correcting errors of position information of the grass mower 1. The correction information is appropriately transmitted to the grass mower 1 through the transmission and reception apparatus 22 and the communication antenna 26. The transmission timing of the correction information may be, for example, timing requested by the grass mower 1 or predetermined intervals (for example, every 100 ms).

Although the RTK-GPS is used as a positioning system in the present embodiment, a differential GPS (Differential GPS: differential positioning system) may be used.

The grass mower 1 includes a control apparatus 10, a vehicle speed sensor 11, an azimuth angular-velocity sensor 12, a drive control unit 13, a GPS antenna 15, a communication antenna 16, an operation input unit 17, a display unit 18, and an audio output unit 19.

The control apparatus 10 is an example of a work machine control system of the present invention, and the control apparatus 10 includes: a computer apparatus including a CPU, a communication function, a storage function (drive unit and/or input-output interface for internal recording medium and external recording medium), and a display function (display); and a predetermined computer program. The computer program causes the computer apparatus to function as a GPS reception unit 101, a transmission and reception unit 102, a vehicle information reception unit 105, a drive instruction unit 106, a control information generation unit 107, a storage unit 108, a removable recording medium interface unit 109, a main control unit 112, a work complete and incomplete position recording unit 121, a corresponding point decision unit 122, a determination information generation unit 123, and a notification signal and command generation unit 124. The main control unit 112 comprehensively controls the operation of the units. The computer apparatus includes an RTC (Real Time Clock) module that outputs time data and a synchronous clock of the control operation. The control apparatus 10 may include an azimuth angular-velocity sensor in case that the grass mower itself does not include the azimuth angular-velocity sensor. Details of the control apparatus 10 will be described later.

The vehicle speed sensor 11 detects the travel speed of forward movement or backward movement of the grass mower 1. The azimuth angular-velocity sensor 12 detects behaviors (dynamic state), such as inclination, turning, and wobble, of the grass mower 1 based on the angular velocity around three-dimensional axis lines (roll, pitch, and yaw). Data measured by an accelerometer may substitute the data measured by the azimuth angular-velocity sensor 12. Measurement results of various instruments included in the grass mower 1 can be acquired to substitute the sensors 11 and 12.

The drive control unit 13 controls a work driving mechanism that drives ascent, descent, actuation, and the like of mowing blades included in the grass mower 1 based on a work control signal described later and controls a travel driving mechanism that drives right and left turns, forward movement, backward movement, and the like of the grass mower 1 based on a travel control signal described later. Although the drive control unit 13 may be provided separately from the control apparatus 10 as illustrated, the drive control unit 13 may be realized as a function of the control apparatus 10.

The GPS antenna 15 functions as a position detection sensor that receives GPS data transmitted from a GPS satellite. The communication antenna 16 enables communication with the communication antenna 26 of the base station 2. The communication is used to transmit and receive correction information for correcting an error of the position information of the grass mower 1, communication with the operator of the grass mower 1, a signal for remote operation of the grass mower 1, and the like.

The operation input unit 17 includes, but is not limited to, a keyboard and a mouse.

The display unit 18 includes, but is not limited to, a CRT, a liquid crystal display, and a stacked indicating lamp.

The audio output unit 19 includes, but is not limited to, a speaker.

The travel route generation apparatus 3 includes: a computer apparatus including a CPU, a communication function, a storage function (drive unit and/or input-output interface for internal recording medium and external recording medium), an input function (keyboard, mouse, and the like), and a display function (display); and a predetermined computer program. The computer program causes the computer apparatus to function as a control unit 30 including a zone setting unit 301, a route generation unit 302, an operation setting unit 303, and a main control unit 304, an operation input unit 31, a display unit 32, a storage unit 33, a removable recording medium interface unit 34, and a transmission and reception unit 35. The main control unit 304 comprehensively controls the operation of the units. Details of the travel route generation apparatus 3 will be described later.

Grass Mower

Figure 2B:
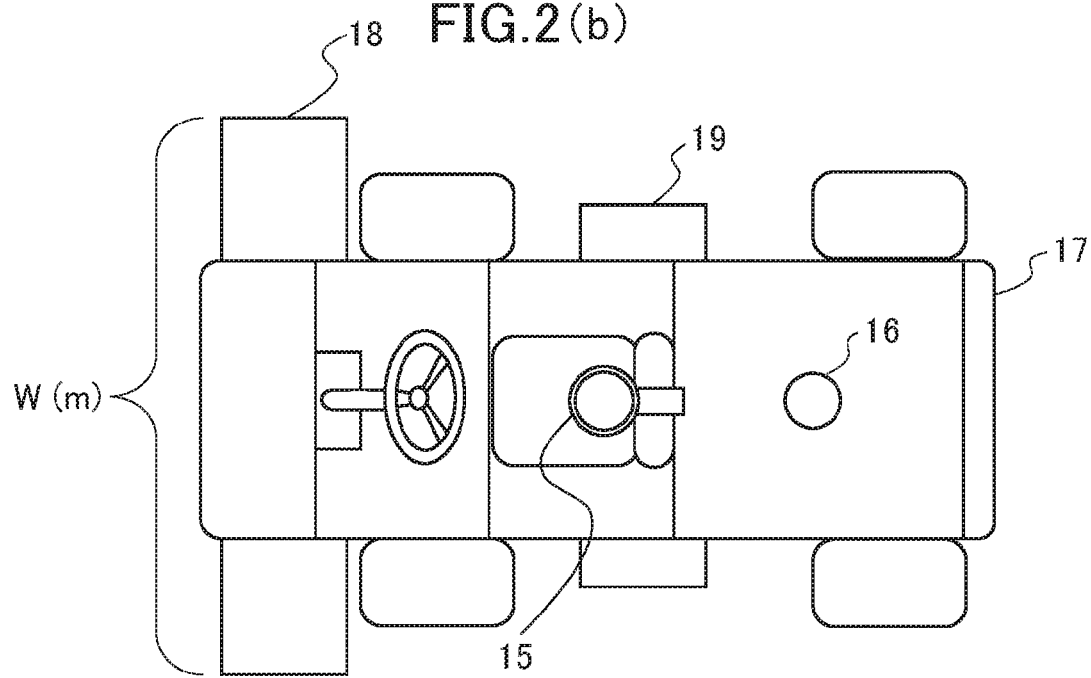
FIG. 2(b) is an upper external view.

FIGS. 2(a) and 2(b) show an appearance of the grass mower 1. FIG. 2(a) is a side external view of the grass mower 1, and FIG. 2(b) is an upper external view of the grass mower. The control apparatus 10, the vehicle speed sensor 11, the azimuth angular-velocity sensor 12, the drive control unit 13, the travel driving mechanism, and the work driving mechanism are included in the body of the grass mower 1.

The azimuth angular-velocity sensor 12 is installed at a position in which the behavior of the grass mower 1 is correctly transmitted. The GPS antenna 15 is provided at a substantially the center part of the body of the grass mower 1, that is, substantially the center in the length direction and the width direction of the body. The communication antenna 16 is attached to extend from the backside surface of the body of the grass mower 1 so as not to obstruct the reception by the GPS antenna 15.

The grass mower 1 includes a set of mowing blades 18 and 19 for mowing grass. The front mowing blade 18 mows grass at left and right edges of a mowing width W[m] in a direction orthogonal to the travel direction. The back mowing blade 19 mows grass at a center section of the mowing width W[m]. The mowing width W[m] is a working width that one travel of the grass mower 1 can mow the grass in the work.

Control Apparatus

Returning to FIG. 1(a), the GPS reception unit 101 of the control apparatus 10 outputs GPS data received by the GPS antenna 15 to the control information generation unit 107. The transmission and reception unit 102 enables communication between the control information generation unit 107 and the base station 2 through the communication antenna 16 and outputs, to the control information generation unit 107, correction information for correcting an error of position information of the grass mower 1 received by the communication antenna 16. The control information generation unit 107 generates the position information indicating the current position of the grass mower 1 based on the GPS data received by the GPS antenna 15 and based on the correction information for correcting an error of the position information of the grass mower 1 received by the communication antenna 16. The transmission and reception unit 102 can be connected to an arbitrary network, either a wired network or a wireless network, and either a LAN (Local Area Network) or a public communication line.

The vehicle information reception unit 105 acquires detection information indicating the travel speed, the azimuth, and the behavior of the grass mower 1 by tracking the position based on the vehicle speed sensor 11, the azimuth angular-velocity sensor 12, and/or the GPS data. When the acquired information is analog data, the data is converted to digital data and output. In this case, the data is corrected as necessary, in which offset components and drift components are removed from the output of the azimuth angular-velocity sensor 12. The output information of the vehicle information reception unit 105 is recorded in the storage unit 108 in association with current time data.

The drive instruction unit 106 outputs, to the drive control unit 13, information defining the details of the control of the travel driving mechanism or the work driving mechanism to control the travel or the work of the grass mower 1 based on the output information (travel control signal/work control signal) of the control information generation unit 107. The drive control unit 13 controls the travel driving mechanism or the work driving mechanism of the grass mower based on the information. This enables the grass mowing work by the grass mower 1.

The storage unit 108 can record a travel route and operation data generated by the travel route generation apparatus 3 described later, a predetermined computer program, and the like. The storage unit 108 includes, but is not limited to, an arbitrary number of storage components, such as a hard disk and a semiconductor memory.

An optical disk, such as a CD-ROM and a DVD, and a removable recording medium 40, such as a USB memory and an SD memory card, can be removably mounted on the removable recording medium interface unit 109. The removable recording medium interface unit 109 can read the data recorded in the mounted removable recording medium 40 and write data in the removable recording medium 40. The removable recording medium interface unit 109 is, for example, a dedicated reader/writer or the like if the removable recording medium 40 is an optical disk, such as a CD-ROM and a DVD, is a USB port or the like if the removable recording medium 40 is a USB memory, and is a card slot or the like if the removable recording medium 40 is an SD memory card. However, the removable recording medium interface unit 109 is not limited to these.

The travel route and the operation data generated by the travel route generation apparatus 3 described later are recorded in the storage unit 108 or the removable recording medium 40 mounted on the removable recording medium interface unit 109, and the control information generation unit 107 generates and outputs a travel control signal and a work control signal based on the travel route and the operation data and based on the current position acquired by the GPS data and/or the various sensors 11 and the like. This allows work by automatic travel.

The work complete and incomplete position recording unit 121, the corresponding point decision unit 122, the determination information generation unit 123, and the notification signal and command generation unit 124 that are specific to the entry availability determination apparatus 60 included in the control apparatus 10 will be described in the following section <Entry Availability Determination Apparatus>, and a travel route search unit 125 that is specific to the travel route automatic selection apparatus 70 will be described in the following section <Travel Route Automatic Selection Apparatus>.

Entry Availability Determination Apparatus

The entry availability determination apparatus 60 is an example of an entry availability determination system of the present invention and is equivalent to a part surrounded by a dotted line in the control apparatus 10 of FIG. 1a. The same configuration as the configuration of the control apparatus 10 described above will not be described.

The work complete and incomplete position recording unit 121 records, in the storage unit 108, a final grass mowing work completion position and a first grass mowing work incomplete position of the time that the grass mower 1 stops traveling and gets out of the travel route in the middle of the travel on the travel route by the grass mower 1 for the grass mowing work.

The corresponding point decision unit 122 decides a nearest point that is a point on the travel route recorded in the storage unit 108 closest to the detected current position for preparing entry of the grass mower 1.

The determination information generation unit 123 determines that the entry of the grass mower 1 to the travel route is impossible if the distance between the current position for preparing entry of the grass mower 1 and the nearest point is larger than a predetermined first value or if an absolute value of an angle of direction of the grass mower 1 at the current position for preparing entry with respect to the tangent line at the nearest point on the travel route is larger than a predetermined second value, and generates determination information indicating whether the entry is possible.

The notification signal and command generation unit 124 generates a signal or a command for instructing notification indicating that the entry is possible and/or the entry is impossible based on the determination information.

Details of the operation of the work complete and incomplete position recording unit 121, the corresponding point decision unit 122, the determination information generation unit 123, and the notification signal and command generation unit 124 will be described later.

Travel Route Automatic Selection Apparatus

The travel route automatic selection apparatus 70 is an example of a travel route automatic selection system of the present invention and is equivalent to a part surrounded by an alternate long and short dash line in the control apparatus 10 of FIG. 1*a*. The same configuration as the configuration of the control apparatus 10 described above will not be described.

For predetermined travel route corresponding to each of a plurality of work target zones, the travel route search unit 125 searches a travel route satisfying a condition that the grass mower 1 can enter from the current position for preparing entry of the grass mower 1 only by forward movement along the entry route formed so that the grass mower 1 enters at the entry position in the same direction as the traveling direction when the grass mower 1 travels the travel route, at the entry position positioned between a travel route start position and a work start position, from predetermined travel route corresponding to each of the plurality of work target zones by determining whether the condition is satisfied based on at least travel route part at a predetermined distance from the travel route start position at least between the travel route start position and the work start position of the predetermined travel route corresponding to each of the plurality of work target zones recorded in the storage unit 108.

Travel Route Generation Apparatus

The travel route generation apparatus 3 is an example of a travel route generation system of the present invention, and the travel route generation apparatus 3 generates the travel route for the grass mower 1 to travel. With reference to FIG. 1(*b*), the operation input unit 31 includes, but are not limited to, a keyboard and a mouse. The display unit 32 includes, but is not limited to, a CRT and a liquid crystal display.

The storage unit 33 can record a travel route and operation data generated by the travel route generation apparatus 3 described later, a predetermined computer program, and the like. The storage unit 33 includes, but is not limited to, an arbitrary number of storage components, such as a hard disk and a semiconductor memory.

An optical disk, such as a CD-ROM and a DVD, and the removable recording medium 40, such as a USB memory and an SD memory card, can be removably mounted on the removable recording medium interface unit 34. The removable recording medium interface unit 34 can read the data recorded in the mounted removable recording medium 40 and write data in the removable recording medium 40. The removable recording medium interface unit 34 is, for example, a dedicated reader/writer or the like if the removable recording medium 40 is an optical disk, such as a CD-ROM and a DVD, is a USB port or the like if the removable recording medium 40 is a USB memory, and is a card slot or the like if the removable recording medium 40 is an SD memory card. However, the removable recording medium interface unit 34 is not limited to these.

The transmission and reception unit 35 can be connected to an arbitrary network, either a wired network or wireless network, or either a LAN (Local Area Network) or a public communication line. The transmission and reception unit 35 can transmit, for example, the travel route and the operation data generated by the travel route generation apparatus 3 described later to the control apparatus 1 through the network.

Figure 3A:
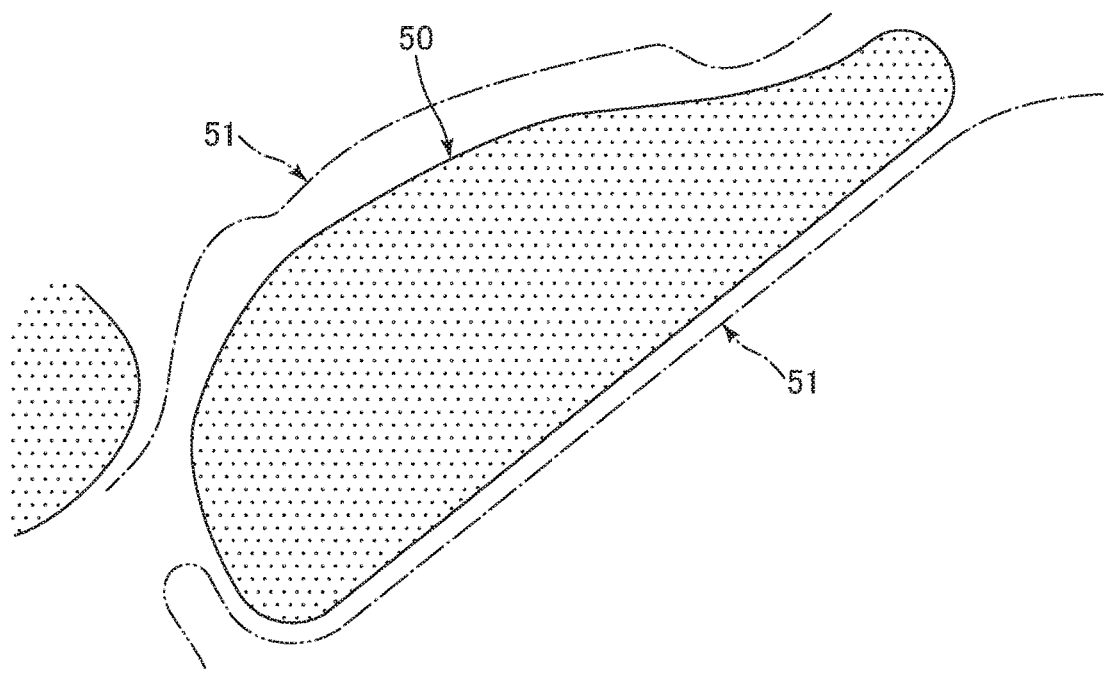
FIGS. 3(a) and 3(b) are explanatory views of setting a periphery of a work zone and setting a periphery of an entry prohibited zone in a golf course.
Figure 3B:
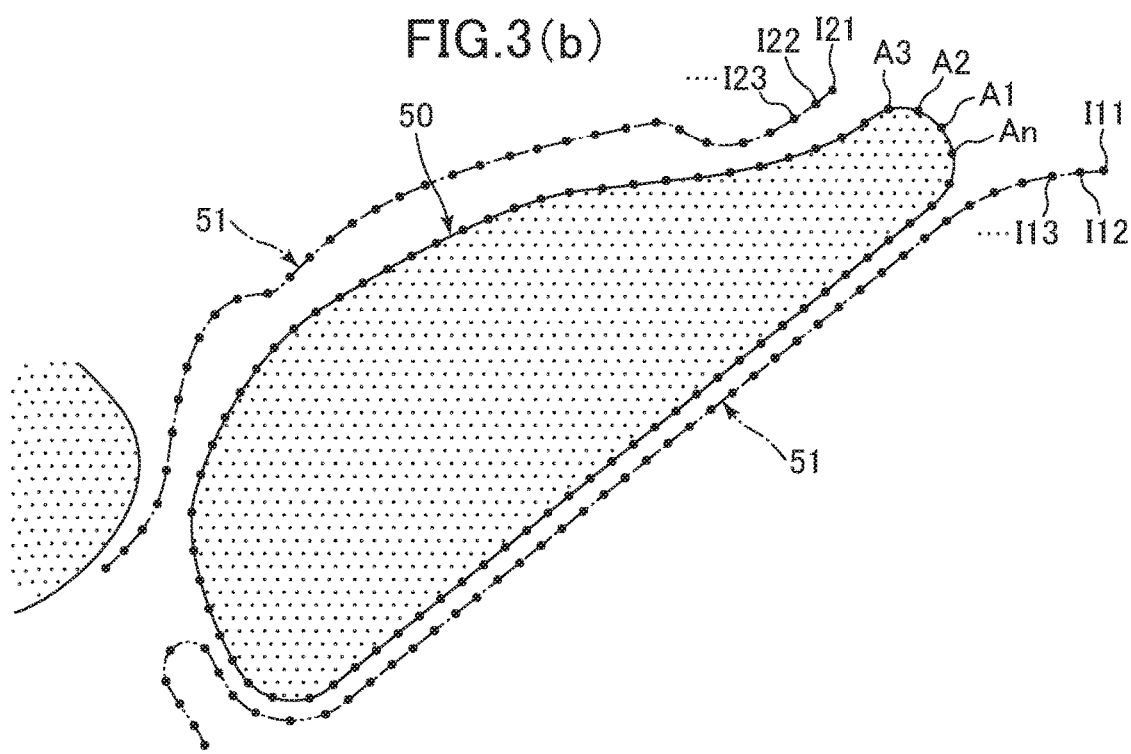

The control unit 30 includes a zone setting unit 301, a route generation unit 302, and an operation setting unit 303. FIGS. 3(*a*) and 3(*b*) are explanatory views of setting a periphery of a work zone and setting a periphery of an entry prohibited zone in a golf course. The zone setting unit 301 sets: a periphery 50 of a work target zone in which the grass mower 1 performs the grass mowing work; and a periphery 51 of an entry prohibited zone 51 that prohibits the entry of the grass mower 1 because of the presence of a cliff, a bunker, a rock, a tree, or the like.

Specifically, the zone setting unit 301 reads, through the removable recording medium interface unit, information of the recording medium recording an aggregate of discrete position information in relation to the periphery 50 of the work target zone and the periphery 51 of the entry prohibited zone actually measured by a publicly known measurement apparatus using the GPS data or the like as illustrated by coordinates A1, A2, . . . , An, coordinates I11, I12, I13, . . . , and coordinates I21, I22, I23, . . . in FIG. 3(*b*) and connects adjacent coordinates of the discrete position information in relation to the periphery 50 of the work target zone and the periphery 51 of the entry prohibited zone to record them as the periphery 50 of the work target zone and the periphery 51 of the entry prohibited zone in the storage unit 33. The measurement apparatus is not limited to an apparatus that uses the GPS data or the like, and an arbitrary apparatus can be used. The latitude, the longitude, and the like of the periphery 50 of the work target zone and the periphery 51 of the entry prohibited zone may be directly input through the operation input unit 31. The set periphery 50 of the work target zone and the set periphery 51 of the entry prohibited zone may be able to be corrected by an arbitrary method.

The route generation unit 302 generates a periphery route C based on the periphery 50 of the work target zone that is set by the zone setting unit 301. The route generation unit 302 further generates straight routes based on the generated periphery route C as described later and generates, for example, "connection routes" including a travel route from an arbitrarily set automatic travel route start position to a work start position of a straight route, a travel route from a position in which the work in all straight routes is finished to a work start position of a periphery route, and a travel route from a work end position of the periphery route to an arbitrarily set automatic travel end position. Therefore, the routes to be traveled by the grass mower 1 are recorded in the storage unit 33.

Based on the attribute information input through the operation input unit 31, including the body size of the grass mower 1, the mowing width of the mowing blade, turning characteristics such as the minimum turning radius and the shape of the curved line formed during turning, intervals between adjacent straight routes, and the positional relationship between the periphery 50 of the work target zone and the periphery 51 of the entry prohibited zone, the route generation unit 302 selects the type of inversion route for the grass mower 1 finished with traveling in one straight route (first straight route) to change the direction to the next straight route (second straight route) such that at least the grass mower 1 traveling on the inversion route does not interfere with the periphery 51 of the entry prohibited zone. The route generation unit 302 links the inversion route with the first and second straight routes and records the travel route in the storage unit 33.

The operation setting unit 303 generates operation data associated with the travel route generated by the route generation unit 302, including various settings regarding the grass mowing work including ascending and descending operation of the mowing blades 18 and 19 and the start or the stop of the rotation of the mowing blades 18 and 19 when the grass mower 1 is traveling or stopping, and including the speed of the grass mower 1 and the traveling direction (forward movement or backward movement) during inversion route travel.

Figure 7:
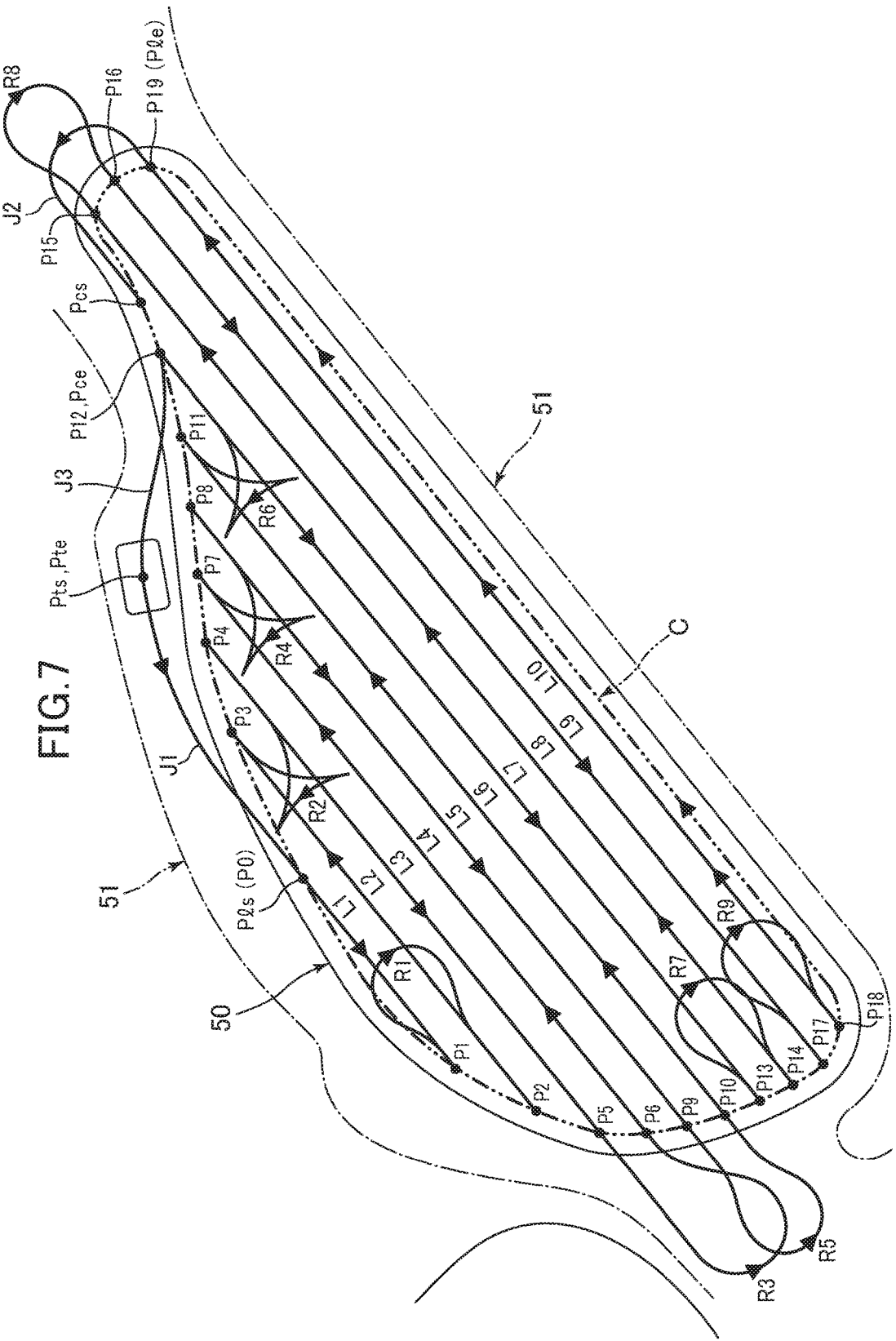
FIG. 7 depicts an example of a generated travel route.

Based on the above configuration of the apparatus, an example of a travel route generation process of the travel route generation apparatus according to an embodiment of the present invention will be described with reference to a flow chart shown in FIG. 4, a generated travel route shown in FIG. 7, and the like. For the convenience of the description, part of the reduced scale and the shape of each of the periphery 50 of the work target zone, the periphery 51 of the entry prohibited zone, the straight routes, and the inversion routes in FIG. 7 is not accurate.

In step S1, as described, the zone setting unit 301 reads, through the removable recording medium interface unit, information of the recording medium recording an aggregate of discrete position information in relation to the periphery 50 of the work target zone and the periphery 51 of the entry prohibited zone actually measured by a publicly known measurement apparatus using the GPS data or the like as illustrated by coordinates A1, A2, . . . , An, coordinates I11, I12, I13, . . . , and coordinates I21, I22, I23, . . . in FIG. 3(*b*) and connects adjacent coordinates of the discrete position information in relation to the periphery 50 of the work target zone and the periphery 51 of the entry prohibited zone to record them as the periphery 50 of the work target zone and the periphery 51 of the entry prohibited zone in the storage unit 33.

In step S2, the attribute information including the body size of the grass mower 1, the speed characteristics, the mowing width of the mowing blade, and the turning characteristics, such as the minimum turning radius and the shape of the curved line formed in turning, and the intervals between adjacent straight routes are input through the operation input unit 31. Part or all of the information to be input may be stored in advance in the storage unit 33, and the information may be read out. Here, the intervals between the adjacent straight routes are determined based on the mowing width of the mowing blade by considering the overlap amount of the mowing width in the adjacent straight routes, and the route generation unit 302 may automatically calculate the intervals based on the input mowing width of the mowing blade.

In step S3, since the periphery route C is about W/2 [m] inside from the periphery 50 of the work target zone when the mowing width W of the mowing blade 18 is taken into account, the route generation unit 302 generates the periphery route C from the periphery 50 of the work target zone.

In step S4, the route generation unit 302 generates a straight route based on the generated periphery route C. First, a work start position Pls of the straight route and an end P1 of the straight route opposing the work start position Pls are designated through the operation input unit 31. Straight lines having intersections with the periphery route C are selected from a group of straight lines generated apart from the straight line passing through the work start position Pls and the end P1 at the interval of the adjacent straight routes that are input in step S2, and segments connected to the intersections serve as the straight routes.

For example, as shown in FIG. 5, an intersection (coordinate) that is the work start position Pls among the intersections of the periphery route C and the straight routes is P0. An intersection (coordinate) opposing the intersection (coordinate) P0 (Pls) across the periphery route C is P1. Furthermore, an intersection (coordinate) adjacent to the intersection (coordinate) P1 in the counterclockwise direction is P2, and an intersection (coordinate) opposing the intersection (coordinate) P2 across the periphery route C is P3. Similarly, numbers are sequentially allocated from an intersection (coordinate) P4 to an intersection (coordinate) P19 (Ple). In this way, the work of sequentially allocating the numbers from 0 to a plurality of intersections (coordinates) will be called labeling, and the numbers will be called labels. The order of labeling is the order of intersections (coordinates) with the periphery route C that the grass mower 1 passes through when traveling the straight routes.

More specifically, the grass mower 1 travels the straight route from the intersection (coordinate) P0 (Pls) toward the intersection (coordinate) P1, then changes the direction from the intersection (coordinate) P2 to the intersection (coordinate) P3, and sequentially travels the straight routes. The same applies to the intersection (coordinate) P4 and subsequent intersections.

The set periphery 50 of the work target zone, the set periphery 51 of the entry prohibited zone, and the generated straight routes are displayed on the display unit 32, and the user can modify the positions and the directions of the generated straight routes, the intervals between adjacent straight routes, and the like, based on input through the operation input unit 31.

Although the substantially parallel routes are straight routes in the present embodiment, the routes may be arbitrary curved routes.

Although the inclination of the straight routes with respect to the work start position Pls of the straight routes is decided by designating the end P1 of the straight route opposing the work start position Pls in the present embodiment, after the designation of the work start position Pls of the straight routes, the route generation unit 302 may automatically decide the inclination of the straight routes (direction of curved routes in the case of curved routes) based on a rule that is set in advance by the user and stored in the storage unit 30. It is considered as the rule the user sets in advance that, for example, the inclination of the straight routes is set as the inclination that can obtain the longest segment in the group of segments connected to the intersections with the periphery route C by rotating, around the work start position Pls of the straight route, the straight line passing through the designated work start position Pls of the straight route and the group of straight lines based on the straight line.

Although the work zone consists of one plane mowed in straight lines in one direction in the present embodiment, not the entire course is mowed in the same direction in some cases, such as a dogleg course in a golf course. The course may be divided into some parts, and the direction of mowing may be arranged in one direction in each part. In such a case, the zone of each part can be designated through, for example, the operation input unit 31, and the process of step S4 and subsequent steps can be applied to each part.

In step S5, based on the input attribute information and the intervals between adjacent straight routes, the route generation unit 302 generates inversion routes of a droplet type, a right-half droplet type, a left-half droplet type, and a switchback type as shown in FIG. 6 by using predetermined algorithms corresponding to the types of the inversion routes and records the inversion routes in the storage unit 33. Although one inversion route is generated for each type in the present embodiment, a plurality of inversion routes with different curvatures may be generated for each type of inversion route.

The inversion route of the droplet type is characterized in that there is no sharp curve on both left and right sides, and the drivability is good. However, an interference is easily occurred between the grass mower 1 traveling on the inversion route and the periphery 51 of the entry prohibited zone when the periphery 50 of the work target zone and the periphery 51 of the entry prohibited zone are close to each other. Furthermore, the grass is easily damaged when the curvature of the inversion route is large.

The inversion route of the right-half droplet type is characterized in that the interference with the periphery 51 of the entry prohibited zone can be easily avoided on the left side of the inversion route. Similarly, in the inversion route of the left-half droplet type, the interference with the periphery 51 of the entry prohibited zone can be easily avoided on the right side of the inversion route.

The inversion route of the switchback type includes two switchback points (turn points from forward movement to backward movement) as shown in FIG. 6, and respective curves between a starting point and a first switchback point, the first switchback point and a second switchback point, and the second switchback point and an end point are based on clothoid curves that are transition curves. The inversion route of the switchback type is characterized in that the inversion route is based on the clothoid curves that are transition curves, and the grass is not easily damaged. On the other hand, the inversion takes time.

Outside inversion routes in which the grass mower 1 enters the inversion route in the outside direction of the work target zone and inside inversion routes in which the grass mower 1 enters the inversion route in the inside direction of the work target zone are prepared for the types of direction of the inversion routes. In the outside inversion route, the grass mower 1 enters the inversion route by forward movement, and in the inside inversion route, the grass mower 1 enters the inversion route by backward movement.

In step S6, whether the grass mower 1 traveling on the inversion route connected as an outside inversion route to the ends of a pair of adjacent straight routes interferes with the entry prohibited zone is determined in order of the droplet type, the right-half droplet type, the left-half droplet type, and the switchback type. When a type of inversion route that does not interfere with the entry prohibited zone is discovered, the type of inversion route is selected as the travel route and is linked to the ends of the pair of adjacent straight routes in step S7. In this case, there is usually a gap between one of the starting point and the end point of the generated inversion route and one of the ends of the pair of adjacent straight routes. Therefore, a straight line that overlaps the straight route or that serves as an extension of the straight route is supplied to link them.

For example, in FIG. 7, when the outside inversion route of the generated inversion route of the droplet type is connected to the intersections (coordinates) P5 and P6 that are the ends of a pair of adjacent straight routes L3 and L4, the grass mower 1 traveling on the inversion route interferes with the entry prohibited zone. Therefore, when the outside inversion route of the inversion route of the right-half droplet type generated next is connected to the intersections (coordinates) P5 and P6, there is still an interference with the entry prohibited zone. Thus, when the outside inversion route of the generated inversion route of the left-half droplet type is connected to the intersections (coordinates) P5 and P6, there is no interference with the entry prohibited zone, and the inversion route of the left-half droplet type is selected as a travel route R3. When the end point of the inversion route of the left-half droplet type is linked to the intersection (coordinate) P6, there is a gap between the starting point of the inversion route of the left-half droplet type and the intersection (coordinate) P5. Therefore, a straight line that serves as an extension of the straight route L3 is supplied to link the inversion route of the left-half droplet type to the intersection (coordinate) P5.

In step S8, when the grass mower 1 traveling on the inversion route interferes with the periphery 51 of the entry prohibited zone even if the outside inversion route of any type of inversion route is connected, whether the grass mower 1 traveling on the inversion route connected as the inside inversion route to the ends of the pair of adjacent straight routes interferes with the entry prohibited zone is similarly determined in order of the droplet type, the right-half droplet type, the left-half droplet type, and the switchback type. When a type of inversion route not interfering with the entry prohibited zone is discovered, the type of the inversion route is selected as the travel route and linked to the ends of the pair of adjacent straight routes in step S9. In this case, there is usually a gap between one of the starting point and the end point of the generated inversion route and one of the ends of the pair of adjacent straight routes. Therefore, a straight line that overlaps with the straight route or that serves as an extension of the straight route is supplied to link them.

For example, for the intersections (coordinates) P1 and P2 that are the ends of the pair of adjacent straight routes L1 and L2 in FIG. 7, the grass mower 1 traveling on the inversion route interferes with the entry prohibited zone when the outside inversion route of any type of inversion route is connected. Therefore, when the inside inversion route of the generated inversion route of the droplet type is connected to the intersections (coordinates) P1 and P2, there is no interference with the entry prohibited zone. Thus, the inversion route of the droplet type is selected as a travel route R1. When the starting point of the inversion route of the droplet type is linked to the intersection (coordinate) P1, there is a gap between the end point of the inversion route of the droplet type and the intersection (coordinate) P2. Therefore, a straight line overlapping with the straight route L2 is supplied to link the inversion route of the droplet type to the intersection (coordinate) P2.

When an appropriate type of inversion route is not discovered in step S9 for a reason that there is a bunker or a pond inside of the green or the like, the display unit 32 or an audio output unit not shown is used to notify the user of the fact. When the grass mower 1 is remotely controlled while generating the travel route, the remotely controlling user may be notified of the fact through the transmission and reception unit 35. The user designates the shape of the inversion route through the operation input unit 31.

In step S10, steps S6 to S9 are repeated until the process is finished for all of the pairs of adjacent straight routes.

In step S11, the travel route start position Pts and the travel route end position Pte are designated through the operation input unit 31.

In step S12, based on the designated travel route start position Pts, the designated travel route end position Pte, and the attribute information input in step S3, the route generation unit 302 uses a predetermined algorithm to generate a start connection route J1 that is a travel route from the travel route start position Pts to the work start position Pls of a straight route, a periphery connection route J2 that is a travel route from the position Ple at the end of the work in all straight routes to the work start position Pcs of the periphery route, and an end connection route that is a travel route J3 from the work end position Pce of the periphery route to the travel route end position Pte. In this way, the travel route start position, the travel route formed by linking the straight routes through the inversion routes, the periphery route, and the travel route end position are connected by the connection routes, and the entire travel route is generated.

The set periphery 50 of the work target zone, the set periphery 51 of the entry prohibited zone, and the generated entire travel route are displayed on the display unit 32, and the user can modify the travel route based on input through the operation input unit 31. For example, a selected inversion route may be replaced by one of the inversion routes of the droplet type, the right-half droplet type, the left-half droplet type, and the switchback type that are already generated. Furthermore, for example, the positions and the directions of the straight routes, the intervals between adjacent straight routes, and the shapes of the inversion routes may also be changed to the ones designated by the user.

In step S13, the route generation unit 302 records the generated entire travel route in the storage unit 33 or the removable recording medium 40 mounted on the removable recording medium interface unit 34.

In step S14, based on the attribute information of the grass mower 1 input through the operation input unit 31, the operation setting unit 303 associates various settings regarding the grass mowing work including ascending and descending operation of the mowing blades 18 and 19, the start or the stop of the rotation of the mowing blades 18 and 19 when the grass mower 1 is traveling or stopping, and the like, the speed of the grass mower 1, and the traveling direction (forward movement or backward movement) during the inversion route travel of the grass mower 1 with the travel route generated by the route generation unit 302 to generate operation setting data.

As for the traveling direction (forward movement or backward movement) during the inversion route travel of the grass mower 1, the default setting is forward movement, and the traveling direction is changed to backward movement in the case of the inside inversion route.

In step S15, the operation setting unit 303 records the generated operation data in the storage unit 33 or the removable recording medium 40 mounted on the removable recording medium interface unit 34.

The generated travel route and operation data may be moved to the control apparatus 10 through the removable recording medium 40. Furthermore, the generated travel route and operation data may be downloaded to the control apparatus 10 through an arbitrary network by the transmission and reception unit 35 of the travel route generation apparatus 3 and the transmission and reception unit 102 of the control apparatus 10. For example, the travel route generation apparatus 3 may be a tablet computer possessed by the operator riding on the grass mower 1, and the generated travel route and operation data may be downloaded to the control apparatus 10 through a wireless LAN. The route generation apparatus 3 may be provided on a base station, and the generated travel route and operation data may be directly downloaded from the base station to the control apparatus 10. Or the generated travel route and operation data may be temporarily downloaded from the base station to an arbitrary computer apparatus such as a tablet computer, and then the generated travel route and operation data may be downloaded from the arbitrary computer apparatus such as a tablet computer to the control apparatus 10.

According to the present embodiment, even if the periphery of the work target zone and the periphery of the entry prohibited zone are close to each other, the travel route of the work machine that enables the work throughout the entire work target zone can be generated.

Although the entire travel route is automatically generated in the embodiment, part or all of the travel route and/or the operation data may be generated by designation by the user. For example, the user can refer to the periphery 50 of the work target zone, the periphery 51 of the entry prohibited zone, and the travel route being generated displayed on the display unit 32 to designate the positions and the directions of the straight routes, the shapes and the directions of the inversion routes, the intervals between the adjacent straight routes, the connection routes, the speed of the grass mower 1, and the ascending and descending operation of the mowing blades 18 and 19.

In the embodiment, in step S6, the outside inversion routes and then the inside inversion routes are used in order of the droplet type, the right-half droplet type, the left-half droplet type, and the switchback type to determine whether the grass mower 1 traveling on the inversion route connected to the ends of the straight routes interferes with the entry prohibited zone. When the inversion route of the type not interfering the entry prohibited zone is discovered, the inversion route of the type is selected as the travel route. However, depending on the positional relationship between the periphery of the work target zone and the periphery of the entry prohibited zone, there may be a case in which although there is an outside inversion route of the droplet type, the right-half droplet type, or the left-half droplet type that does not interfere with the periphery of the entry prohibited zone, the grass may be damaged because the curvature of the inversion route is large, and meanwhile, the grass mower 1 traveling on the inversion route may interfere with the periphery of the entry prohibited zone in the outside inversion route of the switchback type. Therefore, when the curvature of the outside inversion route of the droplet type, the right-half droplet type, or the left-half droplet type is larger than a predetermined value, and the grass mower 1 traveling on the inversion route interferes with the periphery of the entry prohibited zone in the outside inversion route of the switchback type, the inside inversion route of the switchback type may be selected, that is, instead of the outside inversion route, the inside inversion route may be selected as the travel route according to the positional relationship between the periphery of the work target zone and the periphery of the entry impossible zone.

Topographic data (for example, inclination data) other than the periphery of the work target zone or the periphery of the entry prohibited zone may be further recorded in the storage unit 33, and the topographic data other than the periphery of the work target zone or the periphery of the entry prohibited zone may also be referenced to generate the travel route. For example, when there is an inclination, the mowing width projected on a level plane is smaller than the mowing width W of the mowing blade. Therefore, to prevent an unfinished part near the periphery 50 of the work target zone, the inclination may be taken into account to correct and set the periphery route C from W/2 inside of the periphery 50 of the work target zone. The inclination may be taken into account to generate the straight routes to ensure a predetermined value or more of the overlap amount of the mowing width in the adjacent straight routes. The topographic data other than the periphery of the work target zone or the periphery of the entry prohibited zone may be referenced to select the type of the inversion route.

Figure 8:
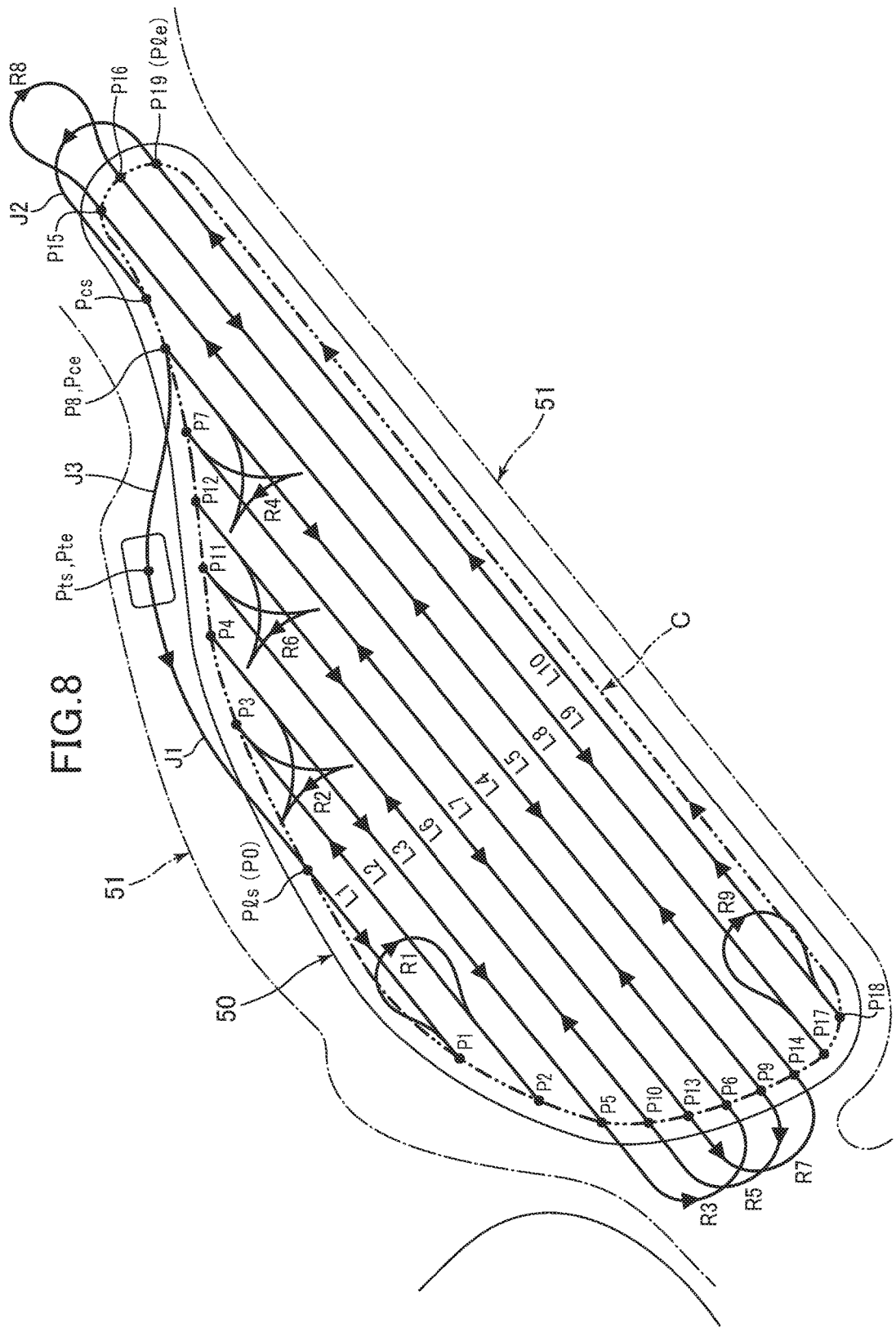
FIG. 8 depicts another example of the generated travel route.

In the example described in the embodiment, the adjacent straight routes are linked and formed through the inversion routes, and the grass mower sequentially travels the adjacent straight routes in opposite directions. However, when the skip route is used, an algorithm of generating a U-shape type inversion route shown in FIG. 6 can be further prepared as a type of inversion route. In step S6, the outside inversion routes and then the inside inversion routes can be used in order of the tray type, the droplet type, the right-half droplet type, the left-half droplet type, and the switchback type to determine whether the inversion route connected to the ends of the straight routes interferes with the entry prohibited zone. When an inversion route of the type not interfering with the entry prohibited zone is discovered, the inversion route of the type can be selected as the travel route and linked to the ends of the straight routes. FIG. 8 shows an example of generating the travel route as a part of which the skip routes are used. In the travel route of FIG. 8, tray-type inversion routes are selected for the inversion routes R3, R5, and R7 in relation to the skip routes. The distances of the tray-type inversion routes R3, R5, and R7 of FIG. 8 are shorter than the inversion routes R3, R5, and R7 of FIG. 7, and the grass is not easily damaged. Therefore, in this case, the work time is short as a whole, and the travel route that does not easily damage the grass can be realized.

Although the present invention is applied to the work machine of the automatic travel system in the example described in the embodiment, the present invention can be applied to a work machine driven by a human according to navigation of the travel route displayed on a display apparatus.

Although the travel route generation apparatus is separate from the travel control apparatus in the embodiment, the travel route generation apparatus may be incorporated into the travel control apparatus.

Although the travel route generation apparatus 3 as an example of the travel route generation system is, for example, a tablet computer in the embodiment, part or all of the travel route generation apparatus 3 may be separate from the tablet computer. For example, a server, a base station, or a travel control apparatus separate from the tablet computer may have part of the functions of the storage unit 108, the zone setting unit 301, the route generation unit 302, and the operation setting unit 303.

Next, an entry availability determination system and a method according to an embodiment of the present invention will be described. First, the principle of entry availability determination will be described.

While the grass mower 1 travels the travel route for the grass mowing work, the grass mower 1 may stop traveling for some reason and get out of the travel route, such as when the grass mower 1 is retreated to use a hole for a play before the end of the grass mowing work in the hole, when the grass mower 1 is moved outside of the hole to inspect an abnormality of the grass mower 1, and when the grass mower 1 needs to be urgently stopped to avoid an unexpected obstacle after detection of the obstacle during the travel in the grass mowing work. In this case, the grass mower 1 needs to be returned to the travel route to restart the grass mowing work from a final grass mowing work complete position (hereinafter, also simply called "work complete position") or a first grass mowing work incomplete position (hereinafter, also simply called "work incomplete position") of the time the grass mower 1 gets out of the travel route. Therefore, the user moves the grass mower 1 to near the work complete position or the work incomplete position. When a travel route in which the work is to be performed, a travel route in which the work is not to be performed, and a travel route in which the work is to be performed are connected, if the work of the previous travel route in which the work is to be performed is all complete, that is, if the work complete position is a connection point of the previous travel route in which the work is to be performed and the travel route in which the work is not to be performed, it is only necessary that the work be restarted from the starting point of the subsequent travel route in which the work is to be performed (connection point of the travel route in which the work is not to be performed and the subsequent travel route in which the work is to be performed), that is, from the work incomplete position. Therefore, the user can also move the work machine to near the work incomplete position in such a case.

Meanwhile, the grass mower 1 automatically travels the travel route based on the current position and a predetermined travel route. More specifically, the grass mower 1 travels along the predetermined travel route while correcting the track based on control such as feedback control and feedforward control. Therefore, once the grass mower 1 starts traveling from a position near the work complete position or the work incomplete position (hereinafter, also called "(current) position for preparing entry"), the grass mower 1 enters the travel route while correcting the track to correct the difference between the current position and the travel route that the grass mower 1 is about to enter, and the grass mower 1 travels the travel route. Therefore, the position on the travel route that the grass mower 1 actually enters the travel route cannot be controlled.

Thus, arranging the grass mower 1 for preparing entry so as to allow the grass mower 1 to enter the travel route only by forward movement in front of the work complete position or the work incomplete position requires a skill, and even a skilled person may fail the arrangement.

Therefore, when it is sure or almost sure that it is impossible for the grass mower 1 to enter the travel route only by forward movement in front of the work complete position or the work incomplete position for an arrangement of the grass mower 1 for preparing entry, transmitting the fact that the entry is impossible to the user makes it possible to avoid the travel of the grass mower 1 from the arrangement for preparing entry in which it is sure or almost sure that the entry is impossible, and to make an arrangement so that the entry is more sure for the grass mower 1.

Furthermore, after intensive studies regarding in what case the grass mower 1 can be more surely arranged for preparing entry, the present inventors have focused on the fact that the distance between the position for preparing entry and the travel route as well as the angle of direction of the grass mower 1 at the position for preparing entry with respect to the direction of the travel route are correlated with the distance from the position for preparing entry along the travel route that is necessary to put the grass mower 1 into the track of the travel route only by forward movement. More specifically, when the distance between the position for preparing entry and the travel route is larger than a predetermined first value or when the absolute value of the angle of direction of the grass mower 1 at the position for preparing entry with respect to the direction of the travel route is larger than a predetermined second value, it is impossible or almost impossible to put the grass mower 1 into the track of the travel route only by forward movement within a certain distance. Therefore, it is sure or almost sure that the entry within a certain distance is impossible in these cases. Thus, if the fact that the entry is impossible is transmitted to the user, the travel of the grass mower 1 from the arrangement for preparing entry in which it is sure or almost sure that the entry is impossible can be avoided, and an arrangement can be made so that the entry is more sure for the grass mower 1.

When the work complete position or the work incomplete position is positioned within the certain distance, the zone in which the work is performed and the zone in which the work will be performed may be discontinuous. Therefore, the arrangement that further ensures the entry can be performed by notifying the user of the fact that the entry is impossible when a point at a distance of a desired third value which is set in advance by adding a margin distance to the distance from a corresponding point described later to a point where the grass mower 1 enters the travel route, in the traveling direction of the work machine in the travel route, is positioned on the side of the traveling direction of the work machine with respect to the work complete position or the work incomplete position.

Here, when the boundary between the part in which the grass mowing work is already performed and the part in which the grass mowing work is not performed yet can be easily determined so that the grass mower 1 can be easily moved to near the work complete position, the grass mower 1 can be often easily arranged substantially along the travel route, that is, the absolute value of the angle of direction of the grass mower 1 at the position for preparing entry with respect to the direction of the travel route is a value smaller than the predetermined second value. If assuming such a case, the angle of direction of the grass mower 1 at the position for preparing entry with respect to the direction of the travel route may not be taken into account.

Furthermore, if the absolute value of the angle of direction of the grass mower 1 at the position for preparing entry with respect to the direction of the travel route is a value smaller than the predetermined value, there is also an effect of preventing an incorrect arrangement in which the direction of the grass mower 1 is the opposite direction of the direction of the travel route. For example, if the absolute value of the angle of direction of the grass mower 1 at the position for preparing entry with respect to the direction of the travel route is a value smaller than 90° when the grass mower 1 is about to enter the straight route, the incorrect arrangement in which the direction of the grass mower 1 is the opposite direction of the direction of the travel route can be prevented.

To obtain the distance between the position for preparing entry and the travel route, the direction of the travel route, and the distance from the position for preparing entry along the travel route that is necessary to put the grass mower 1 into the track of the travel route only by forward movement, a corresponding point on the travel route can be used by considering which point on the travel route corresponds to the current position for preparing entry if the grass mower 1 travels without departing from the travel route, assuming that the current position for preparing entry is a position positioned as a result of the departure from the travel route.

More specifically, when the corresponding point is used, the distance between the position for preparing entry and the travel route is the distance between the position for preparing entry and the corresponding point, and the direction of the travel route is the direction of the tangent line at the corresponding point on the travel route. To obtain the distance from the position for preparing entry along the travel route that is necessary to put the grass mower 1 into the track of the travel route only by forward movement, the distance beginning from the corresponding point is considered.

When the travel route including the corresponding point is a straight line, the tangent line at the corresponding point on the travel route is to coincide with the straight route.

An example of the corresponding point includes a nearest point that is a point on the travel route nearest to the position for preparing entry.

Setting the corresponding point to a work complete side nearest point that is a point on the travel route nearest to the position for preparing entry on the opposite side of the traveling direction of the grass mower 1 with respect to the work complete position or the work incomplete position can prevent the grass mower 1 from accidentally entering a travel route part that the grass mower 1 should not enter when, for example, there are travel routes on both sides near the position for preparing entry. Therefore, the entry to a wrong travel route part can be prevented by selecting the corresponding point under the condition that the corresponding point is positioned on the opposite side (work complete side) of the traveling direction of the grass mower 1 with respect to the work complete position or the work incomplete position, when the travel routes exist on both sides near the position for preparing entry, the point on the travel route nearest to the position for preparing entry exists on the travel route part that the grass mower 1 should not enter, and the point on the travel route second nearest to the position for preparing entry exists on the travel route part that the grass mower 1 should enter.

Here, it goes without saying that an appropriate point other than the nearest point or the work complete side nearest point can be used as the corresponding point.

The predetermined first value and the predetermined second value are preset by considering the steering performance of the grass mower 1, the distance from the corresponding point that the grass mower 1 is desired to enter the travel route, or the like. If the predetermined first value and the predetermined second value are too small, the user needs to arrange the grass mower 1 in a very narrow entry possible area. Therefore, it is preferable that the predetermined first value and the predetermined second value are values at which even an unskilled person can arrange the grass mower 1 to allow entering.

Considering the above circumstances, it is preferable that the second value is a predetermined value equal to or smaller than 30°.

The predetermined third value is set by considering the desired margin distance of the distance from the corresponding point to the point where the grass mower 1 enters the travel route.

Figure 9:
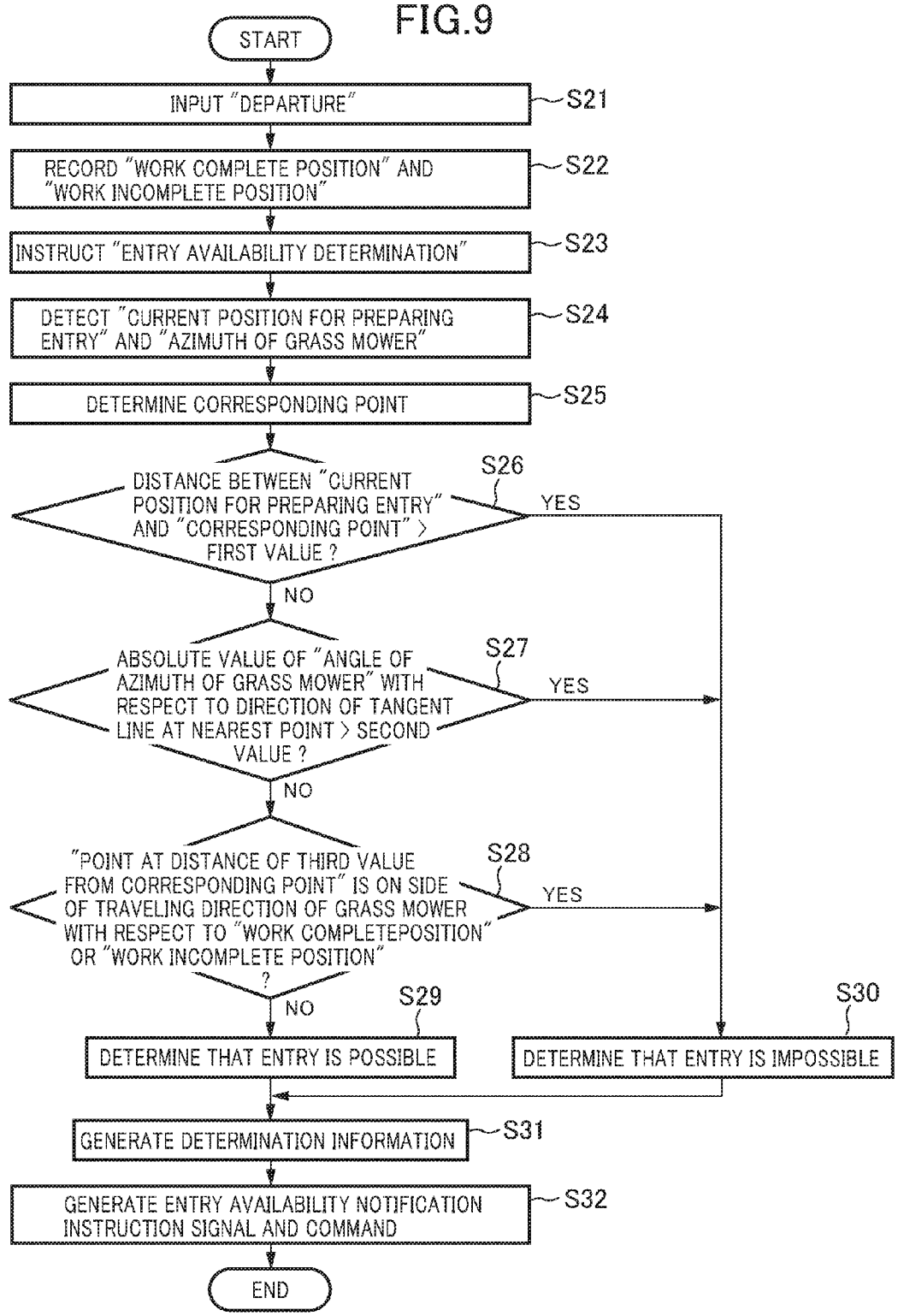
FIG. 9 is a flow chart of an entry availability determination process.
Figure 10:
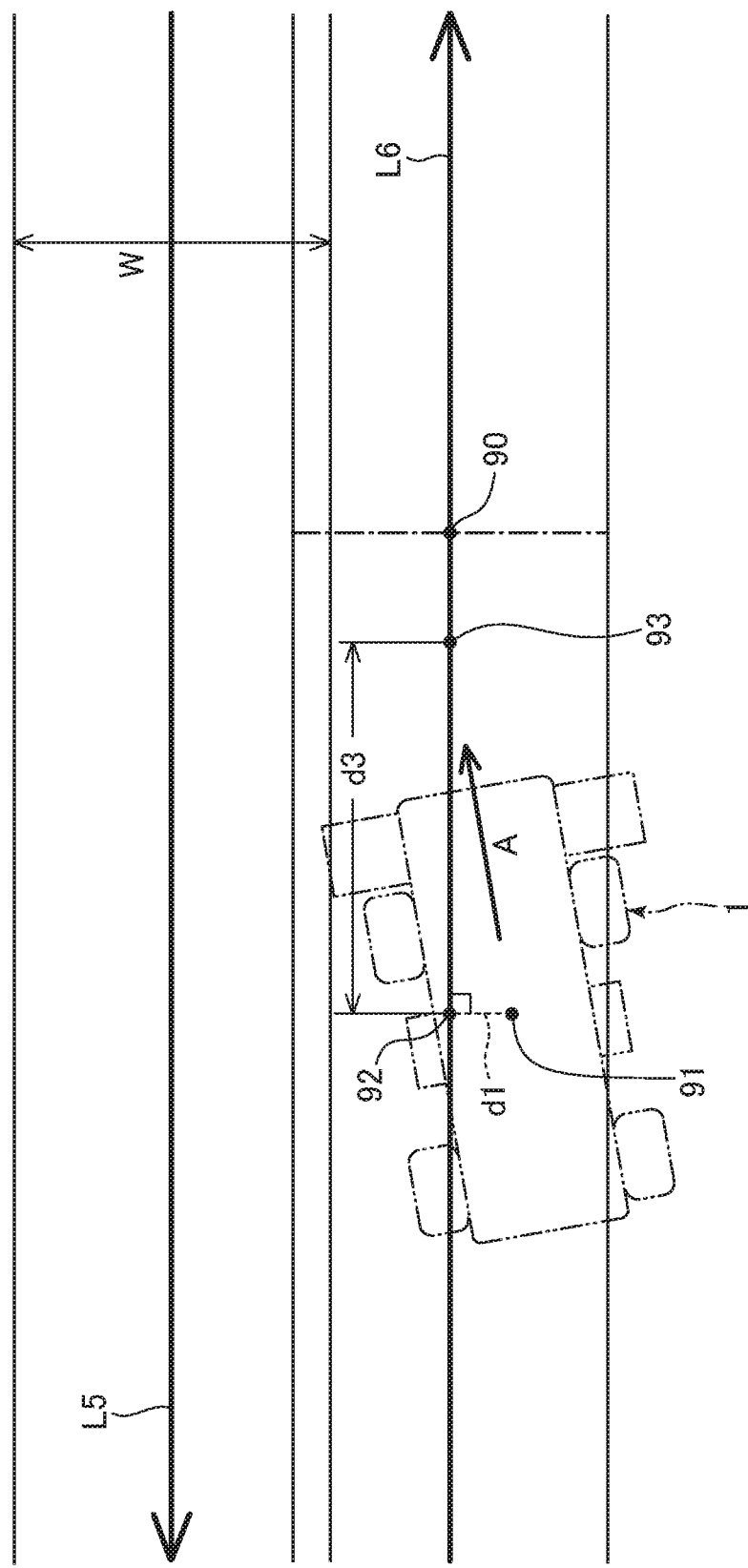
FIG. 10 depicts an example of a state in which the grass mower is arranged at a position for preparing entry.

Subsequently, an example of the entry availability determination process of the entry availability determination system according to an embodiment of the present invention will be described with reference to a flow chart shown in FIG. 9, an example of the state that the grass mower is arranged at the position for preparing entry shown in FIG. 10, and the like. Here, FIG. 10 shows a state in which the grass mower 1 is arranged at a position 91 for preparing entry near a work complete position (work incomplete position) 90 on the straight route L6 of the travel route of FIG. 7. The grass mower 1 is arranged at a distance dl from the straight route L6, in a direction A that is +10° relative to the direction of the straight route L6.

When the grass mower 1 stops traveling for some reason and gets out of the travel route in the middle of the travel on the travel route by the grass mower 1 for the grass mowing work, the user in S21 inputs, to the entry availability determination apparatus 60, the fact that the grass mower 1 gets out of the travel route through the operation input unit 17 or a device outside of the entry availability determination apparatus 60, such as a tablet computer and a computer of the base station.

In S22, when, for example, it is known in advance that the grass mower 1 needs to get out of the travel route, the user instructs the work stop position to the grass mower 1 through the operation input unit 17 or the device outside of the entry availability determination apparatus 60, such as a tablet computer and a computer of the base station. The work complete and incomplete position recording unit 121 records the instructed work stop position as the work complete position in the storage unit 108. The grass mower 1 stops the grass mowing work when the grass mower 1 reaches the instructed work stop position. To ensure more accuracy, the position of the stop of the work may be actually detected and used, in place of the work stop position instructed by the user. When the stop of the travel of the grass mower 1 is not the one instructed in advance, the work complete and incomplete position recording unit 121 is triggered by the input indicating that the grass mower 1 gets out of the travel route in S21 to detect the travel stop position of the grass mower 1 and to record the travel stop position in the storage unit 108. The work complete and incomplete position recording unit 121 refers to the travel stop position and the operation data stored in the storage unit 108 to obtain the grass mowing work complete position and records the grass mowing work complete position in the storage unit 108. More specifically, when the travel is stopped during the grass mowing work, the travel stop position and the grass mowing work complete position substantially coincide. However, when the travel is stopped at a position such as a turn route in which the grass mowing work is not performed, the travel stop position and the grass mowing work complete position do not coincide. Therefore, the operation data associated with the travel route is referenced to specify the grass mowing work complete position. The work complete and incomplete position recording unit 121 also refers to the work stop position or the travel stop position and the operation data stored in the storage unit 108 to obtain the grass mowing work incomplete position and records the grass mowing work incomplete position in the storage unit 108. For example, in FIG. 10, the work stop position or the travel stop position is on the straight route that is a route in which the grass mowing work is performed, and the work incomplete position coincides with the work complete position. Furthermore, for example, in the part formed by the straight route L7, the intersection P15, the inversion route R8, the intersection P16, and the straight route L8 in the travel route of FIG. 7, operation for performing the grass mowing is defined in the operation data of the straight routes L7 and L8, and operation for not performing the grass mowing is defined in the work data of the inversion route R8. Therefore, when the travel stop position is on the inversion route R8, the grass mowing work complete position is specified as the intersection P15, and the grass mowing work incomplete position is specified as the intersection P16. Here, if it is only necessary that the entry is possible from near the work complete position, the configuration of obtaining the work incomplete position and recording the work incomplete position in the storage unit 108 can be eliminated.

Next, the grass mower 1 gets out of the travel route and is moved to a predetermined place. Subsequently, when the grass mowing work is restarted, the grass mower 1 is moved to the position 91 for preparing entry of the grass mower 1 near the work complete position (work incomplete position) 90 (will also be simply called "work complete position 90" because the work complete position and the work incomplete position coincide in FIG. 10 as described above). In S23, the user inputs an instruction of entry availability determination to the entry availability determination apparatus 60 through the operation input unit 17 or the device outside of the entry availability determination apparatus 60, such as a tablet computer and a computer of a base station.

In step S24, the control information generation unit 107 as a detector and the vehicle information reception unit 105 detect the current position 91 for preparing entry of the grass mower 1 and the azimuth A.

In step S25, the corresponding point decision unit 122 decides a nearest point 92 that is a point on the travel route recorded in the storage unit 108 nearest to the detected current position 91 for preparing entry of the grass mower 1. Although the nearest point 92 is used as a corresponding point on the travel route corresponding to the detected current position 91 for preparing entry of the grass mower 1 in the present embodiment, it goes without saying that a corresponding point other than the nearest point can be used, such as a work complete side nearest point that is a point on the travel route nearest to the position for preparing entry on the opposite side of the traveling direction of the grass mower 1 relative to the work complete position or the work incomplete position.

In step S26, the determination information generation unit 123 determines whether the distance dl between the current position 91 for preparing entry and the nearest point 92 is larger than the predetermined first value. In the example of FIG. 10, the travel route is a straight route, and the intersection between a line perpendicular to the straight route L6 passing through the position 91 for preparing entry and the straight route L6 is the nearest point 92.

In step S27, the determination information generation unit 123 determines whether the absolute value of the angle of the direction A of the grass mower 1 with respect to the direction of the tangent line at the nearest point 92 on the travel route is larger than the predetermined second value. In the example of FIG. 10, the travel route is a straight route, and the tangent line at the nearest point 92 coincides with the straight route L6 as described above. The direction A of the grass mower 1 is +10° with respect to the direction of the straight route L6, and the angle of the direction A of the grass mower 1 with respect to the direction of the tangent line at the nearest point 92 is +10°. When the grass mower 1 can be easily moved to near the work complete position or the work incomplete position because the boundary between the part in which the grass mowing work is already performed and the part in which the grass mowing work is not performed yet can be easily determined, the grass mower 1 can be often easily arranged substantially along the travel route, that is, at an angle in which the absolute value of the angle formed by the tangent line at the nearest point on the travel route and the direction of the grass mower 1 is small, and if assuming such a case, the present step can be skipped.

In step S28, the determination information generation unit 123 determines whether a point 93 at a distance of a preset third value d3 from the nearest point 92 in the traveling direction of the grass mower 1 in the travel route is positioned on the side of the traveling direction of the grass mower 1 with respect to the work complete position or the work incomplete position 90. In the example of FIG. 10, the point 93 is positioned on the near side of the work complete position 90. There is no problem even if the grass mowing work by the grass mower 1 is redundant, and the present step can be skipped if assuming that the grass mower 1 is arranged from the beginning on the near side of the work complete position or the work incomplete position at a plenty of distance.

In step S29, the determination information generation unit 123 determines that the entry is possible if all of steps S26 to 28 is No.

In step S30, the determination information generation unit 123 determines that the entry is impossible if one of steps S26 to 28 is Yes.

Although the work complete position and the work incomplete position coincide in FIG. 10, if the work complete position and the work incomplete position are different, that is, if the travel stop position is on the travel route in which the work is not performed, the grass mower 1 cannot enter the travel route only by forward movement within a certain distance from the position for preparing entry when the travel route in which the work is not performed is a travel route in which the grass mower 1 travels by backward movement. Therefore, when an inside inversion route is used as the inversion route, the user usually does not try to enter such a travel route. However, the user may misunderstand that the inside inversion route is an outside inversion route and arrange the grass mower 1 to prepare the entry. Therefore, if it is determined that the entry is impossible when the work complete position and the work incomplete position are different, and the travel route connected to the opposite side of the traveling direction of the grass mower 1 with respect to the work incomplete position is a travel route in which the grass mower 1 travels by backward movement, it is effective for the case of misunderstanding.

In step S31, the determination information generation unit 123 generates determination information indicating whether the entry is possible.

In step S32, the notification signal and command generation unit 124 generates a signal and/or a command for instructing notification indicating that the entry is possible and/or the entry is impossible based on the generated determination information.

The entry availability is notified through the display unit 18, the audio output unit 19, and the like based on the generated signal or command for instructing the notification indicating that the entry is possible and/or the entry is impossible. A publicly known method can be used for the method of notification, such as display on a display, audio output by audio output means, lighting by a stacked indicating lamp, and vibration. In this case, the travel route may also be displayed on the display, and which travel route part (for example, straight route, inversion route, or the like) of the travel route the grass mower 1 will enter may also be displayed. The generated determination information or the command for instructing notification indicating that the entry is possible and/or the entry is impossible can be transmitted through the transmission and reception unit 102 to a tablet computer or a computer of a base station that functions as an entry availability notification apparatus separate from the entry availability determination apparatus 60. The information or the command can be displayed on the display of the tablet computer or the computer of the base station, and/or the sound can be output.

If a signal or a command for instructing notification indicating that the entry is possible is generated in step S32, and it is notified that the entry is possible based on this, the user instructs the control apparatus 10 to start entering (start traveling) through the operation input unit 17. The grass mower 1 automatically travels based on the current position and the travel route stored in the storage unit 108, that is, travels while correcting the track along the travel route. Therefore, once the grass mower 1 starts traveling from the position for preparing entry, the grass mower 1 corrects the track so as to correct the difference between the current position and the travel route that the grass mower 1 is about to enter. The grass mower 1 enters the travel route on the near side of the point 93 and travels on the travel route. When the grass mower 1 enters the travel route, the grass mowing work is restarted.

In the above embodiment, if the signal or the command for instructing notification indicating that the entry is possible is generated in step S32, and it is notified that the entry is possible based on this, the user instructs the control apparatus 10 to start entering (start traveling) through the operation input unit 17. However, if the content of the determination information generated in step S31 indicates that the entry is possible, the control information generation unit 107 may generate a travel control signal for instructing the grass mower 1 to start entering (start traveling), in place of or in addition to the generation of the signal or the command for instructing notification indicating that the entry is possible in step S32. In this way, the grass mower 1 may automatically start entering after the determination indicating that the entry is possible, without the input by the user.

Although the entry availability determination and the notification of the determination result are performed once based on the entry availability determination start instruction input in the above embodiment, the entry availability determination and the notification of the determination result may be continuously performed or intermittently repeated until the entry availability determination end is instructed.

Although the grass mower 1 enters the travel route from the entry position on the travel route near the work complete position or the work incomplete position in the above embodiment, it goes without saying that an arbitrary position positioned on the opposite side of the traveling direction of the work machine relative to the work complete position or the work incomplete position including the start position of the travel route can be set as the entry position to enter the travel route.

Although the entry availability determination apparatus 60 as an example of the entry availability determination system is provided on the grass mower 1 that is a work machine in the above embodiment, part or all of the entry availability determination apparatus 60 may be separate from the grass mower 1. For example, a server or a base station separate from the grass mower 1 may have at least one of part of the functions of the storage unit 108, part or all of the functions of the work complete and incomplete position recording unit 121, part or all of the functions of the corresponding point decision unit 122, part or all of the functions of the determination information generation unit 123, and part or all of the functions of the notification signal and command generation unit 124. The entry availability determination apparatus 60 may be, for example, a tablet computer possessed by the user operating the grass mower 1. When the travel route automatic selection apparatus 70 is formed by using, for example, a tablet computer possessed by the user operating the grass mower 1, it is obvious that a server separate from the tablet computer or the grass mower 1 may have, for example, at least one of part of the functions of the storage unit 108, the work complete and incomplete position recording unit 121, the corresponding point decision unit 122, the determination information generation unit 123, and the notification signal and command generation unit 124.

Next, an example of the travel route automatic selection process of the travel route automatic selection system according to an embodiment of the present invention will be described with reference to a flow chart shown in FIG. 11, an example of a positional relationship between travel routes, travel route start positions, work start positions, and start connection routes corresponding to each of a plurality of work target holes shown in FIG. 12, an example of a state in which the grass mower is arranged at a position for preparing entry shown in FIG. 13, and the like. Details of the part of the same processes as in the entry availability determination apparatus and method described above will not be described.

Figure 12:
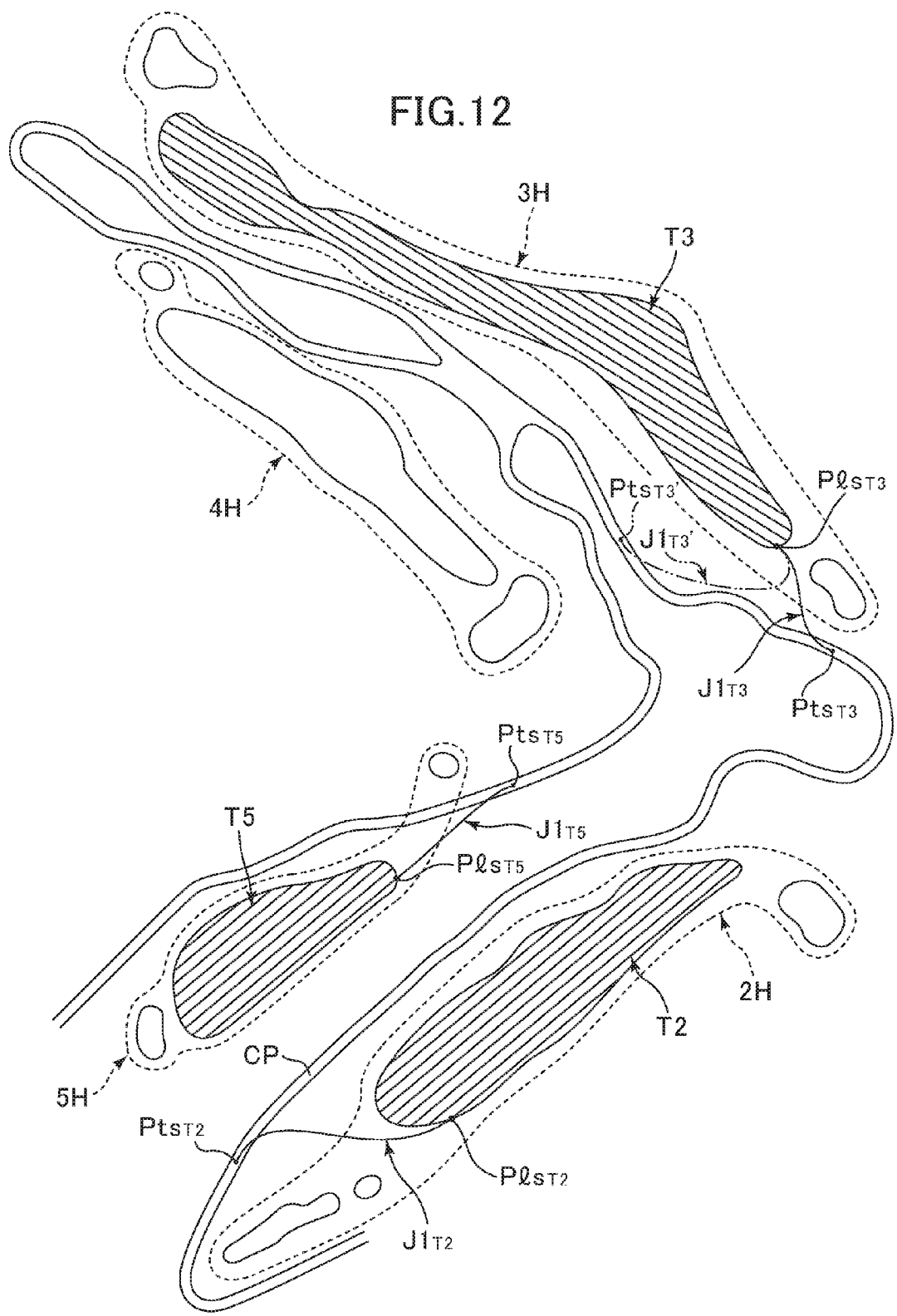
FIG. 12 depicts an example of a positional relationship between travel routes, travel route start positions, work start positions, and start connection routes corresponding to each of a plurality of work target holes.

FIG. 12 shows: a second hole 2H, a third hole 3H, and a fifth hole 5H that are a plurality of work target zones; a fourth hole 4H that is not a work target zone this time; a cart path CP; travel routes T2, T3, and T5 corresponding to the holes, respectively; travel route start positions $Pts_{T2}$, $Pts_{T3}$, and $Pts_{T5}$ as well as work start positions $Pls_{T2}$, $Pls_{T3}$, and $Pls_{T5}$ of the travel routes T2, T3, and T5; and start connection routes $J1_{T2}$, $J1_{T3}$, and $J1_{T5}$ connecting the travel route start positions $Pts_{T2}$, $Pts_{T3}$, and $Pts_{T5}$ and the work start positions $Pls_{T2}$, $Pls_{T3}$, and $Pls_{T5}$, respectively.

Figure 11:
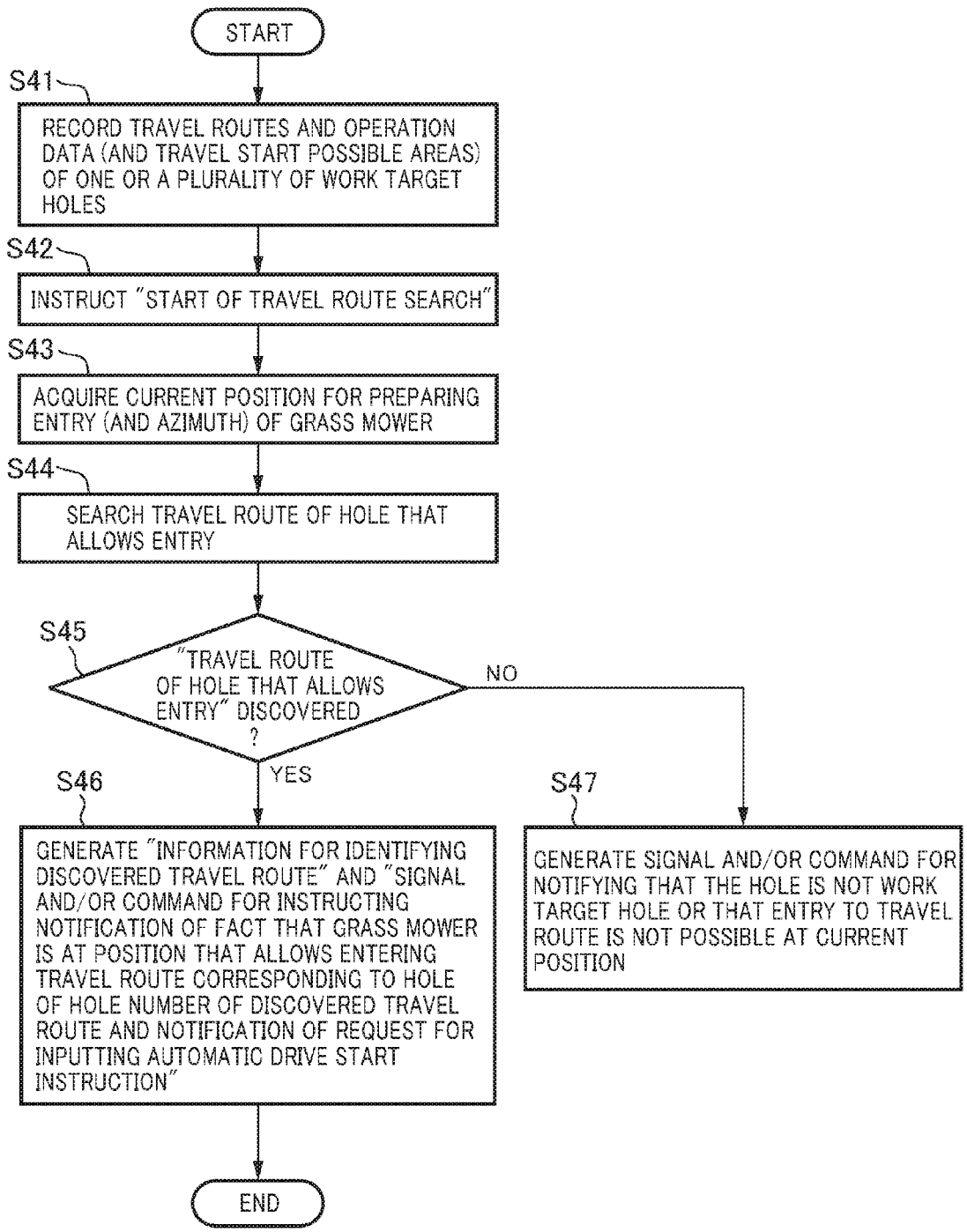
FIG. 11 is a flow chart of a travel route automatic selection process.
Figure 13:
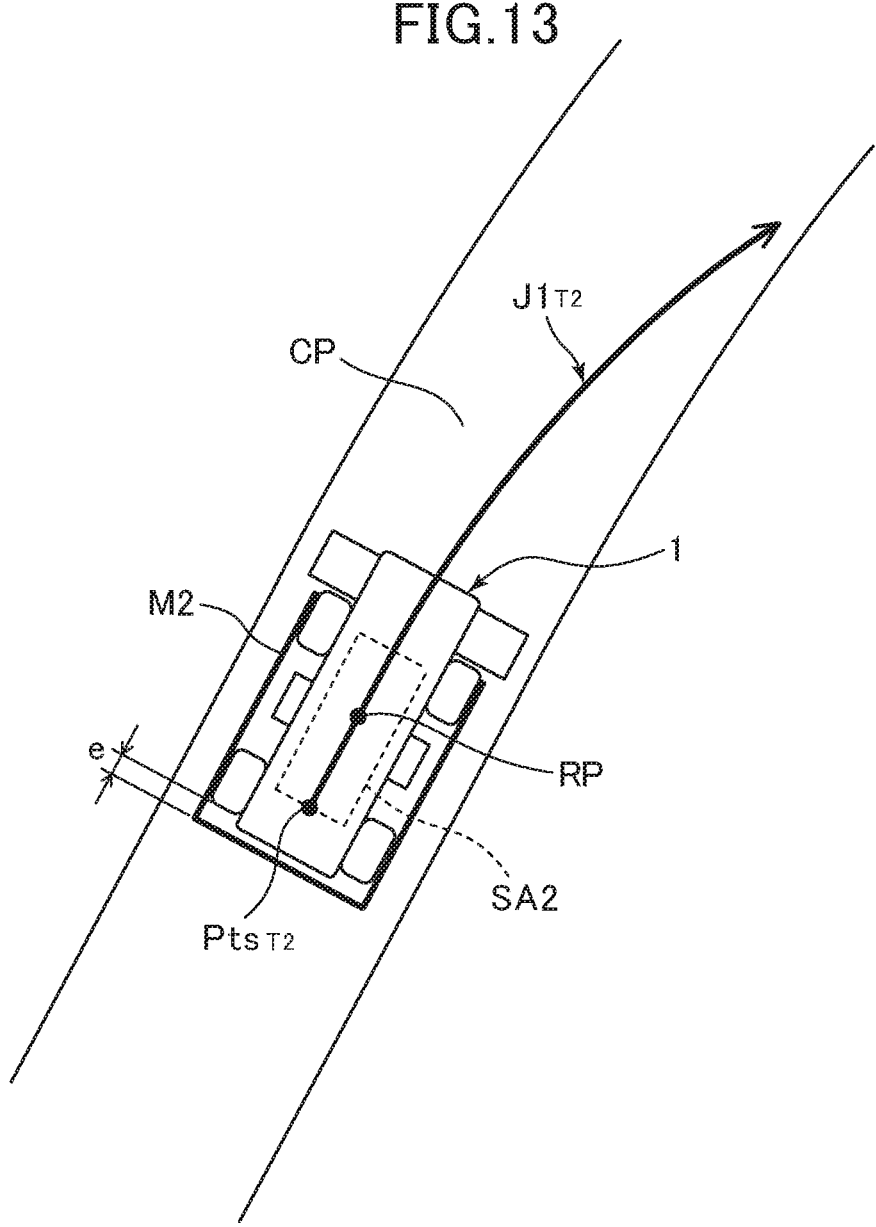
FIG. 13 depicts an example of a state in which the grass mower is arranged at a position for preparing entry.

FIG. 13 is an enlarged view near the travel route start position $Pts_{T2}$ corresponding to the second hole 2H shown in FIG. 11. FIG. 13 shows a state in which the grass mower 1 is arranged at a position RP for preparing entry near the travel route start position $Pts_{T2}$. The grass mower 1 is deviated by a distance e from a mark M2 in the direction of the start connection route $J1_{T2}$. Since the width of the cart path CP is about the same as the width of the grass mower 1 as described later, the position RP for preparing entry of the grass mower 1 is just a little away from the start connection route $J1_{T2}$, and the grass mower 1 is arranged in substantially the same direction as the start connection route $J1_{T2}$ direction.

In S41, the travel routes and the operation data of the second hole 2H, the third hole 3H, and the fifth hole 5H that are a plurality of work target holes generated by the travel route generation apparatus 3 and the like are recorded in the storage unit 108 of the grass mower 1 through the removable recording medium 40 or an arbitrary network as described above.

The user moves the grass mower 1 to the hole in which the work will be performed, by manual drive, remote control, or the like. The cart path is often used for the movement to the hole. The travel route is generated so that the travel route start position of the travel route corresponding to each work target hole is positioned at a position near the hole on the cart path. On the cart path, a mark corresponding to a position closer to the work start position that is at a predetermined distance from the travel route start position of each work target hole is provided as a guide to the entry preparation position near each work target hole. An example of the mark includes a mark like a mark for a parking lot of automobiles in which a range within which a front wheel and a rear wheel can be contained is depicted. Since the width of the cart path is usually about the same as the width of the grass mower 1, the position of the mark is provided on the cart path to limit the position in the vertical direction of the travel route and the direction of the grass mower 1, in relation to the stop position of the grass mower 1. As a result, the distance between the position for preparing entry and the travel route can be smaller than the predetermined first value, and the absolute value of the angle of direction of the grass mower 1 at the position for preparing entry with respect to the direction of the travel route can be smaller than the predetermined second value, just by adjusting the stop position in the front-back direction. Here, the vehicle information reception unit 105 that is azimuth acquirer may acquire the azimuth of the grass mower 1 when it is desired to more accurately determine the entry availability and when the degree of freedom in the direction of the grass mower 1 is large, for example, when the mark is provided in a wide place other than the cart path.

The user first moves the grass mower 1 to the second hole 2H that is the first work target, by manual drive, remote control, or the like. As described, the cart path CP is used for the movement to the hole, and the grass mower 1 is stopped at the (current) position for preparing entry by targeting the mark M2 on the cart path CP near the second hole 2H. When the user rides and drives the grass mower 1, the user stops the grass mower 1 and then gets out of the grass mower 1 after applying the parking brake.

In step S42, the user inputs an instruction for starting the travel route search to the travel route automatic selection apparatus 70 through the operation input unit 17 or the device outside of the travel route automatic selection apparatus 70, such as a tablet computer and a computer of the base station. Instead of this, when the user rides and drives the grass mower 1, the control information generation unit 107 may generate a signal for instructing the start of the travel route search when it is determined that the user has got out of the grass mower 1 after detecting that the parking brake is applied and that a person is not sitting on the driver's seat of the grass mower 1.

In step S43, the control information generation unit 107 that is a current position acquirer acquires the current position RP for preparing entry of the grass mower 1. In addition, the vehicle information reception unit 105 that is azimuth acquirer may acquire the azimuth of the grass mower 1.

In step S44, at the entry position positioned between the travel route start positions $Pts_{T2}$, $Pts_{T3}$, and $Pts_{T5}$ and the work start positions $Pls_{T2}$, $Pls_{T3}$, and $Pls_{T5}$ of the travel route part at a predetermined distance from the travel route start positions $Pts_{T2}$, $Pts_{T3}$, and $Pts_{T5}$ at least between the travel route start positions $Pts_{T2}$, $Pts_{T3}$, and $Pts_{T5}$ and the work start positions $Pls_{T2}$, $Pls_{T4}$, and $Pls_{T5}$ of the travel routes T2, T3, and T5 corresponding to the second hole 2H, the third hole 3H, and the fifth hole 5H that are the work target holes recorded in the storage unit 108, the travel route search unit 125 sequentially determines whether a condition that the grass mower 1 can enter from the current position RP for preparing entry of the grass mower 1 only by forward movement along the entry route formed so that the grass mower 1 enters at the entry position in the same direction as the traveling direction when the grass mower 1 travels the travel route to thereby search the travel route satisfying the condition from the travel routes T2, T3, and T5 corresponding to the second hole 2H, the third hole 3H, and the fifth hole 5H that are the work target holes. The fourth hole 4H is not the work target zone this time and is not the target of the search because the travel route is not recorded in the storage unit 108 of the grass mower 1.

The same procedure as the entry availability determination apparatus and method can be used to determine whether the condition is satisfied. More specifically, for the travel route parts of predetermined distances from the travel route start positions $Pts_{T2}$, $Pts_{T3}$, and $Pts_{T5}$ at least between the travel route start positions $Pts_{T2}$, $Pts_{T3}$, and $Pts_{T5}$ and the work start positions $Pls_{T2}$, $Pls_{T3}$, and $Pls_{T5}$ of the travel routes T2, T3, and T5 corresponding to the second hole 2H, the third hole 3H, and the fifth hole 5H that are the work target holes, respectively recorded in the storage unit 108, the travel route search unit 125 decides the corresponding points that are points on the travel route parts corresponding to the current position RP for preparing entry acquired by the control information generation unit 107 that is a current position acquirer. For each travel route part, it can be determined that the condition is not satisfied when the distance between the current position RP for preparing entry and the corresponding point is larger than a predetermined first value that is set in advance by considering at least the steering performance of the work machine and the desired distance from a corresponding point to a point that the grass mower 1 enters the travel route, when a point at a distance of a third value which is set by considering a margin distance to the desired distance from the corresponding point to the point that the grass mower 1 enters the travel route, from the corresponding point in the traveling direction of the grass mower 1 in the travel route, is positioned on the side of the traveling direction of the grass mower 1 with respect to the work start position, or when the absolute value of the angle of direction of the grass mower 1 with respect to the direction of the tangent line at the corresponding point on the travel route is larger than a predetermined second value based on the azimuth of the grass mower 1 acquired by the vehicle information reception unit 105 that is azimuth acquirer.

Here, if the grass mowing is repeated in the same route, a specific part of the grass may be damaged, or the grass may lie down in a certain direction. Therefore, to avoid repeating the grass mowing of the same route, the travel route generation apparatus 3 or the like may generate travel routes in which the travel route parts of predetermined distances from the travel route start positions between the travel route start positions and the work start positions are the same, and the travel routes in each of the work target zone are different, as travel routes corresponding to each of at least one of the second hole 2H, the third hole 3H, and the fifth hole 5H that are the work target holes. The travel routes may be recorded in the storage unit of the grass mower 1 and one of the travel routes may be selected based on a predetermined selection condition. The date, the day of the week, a work history described later, or the like can be used as the predetermined selection condition.

If the travel route satisfying the condition is discovered in S45, the travel route search unit 125 in S46 generates information for identifying the discovered travel route and a signal and/or a command for instructing notification of the fact that the grass mower 1 is at a position that allows entering the travel route corresponding to the hole of the number of the hole of the discovered travel route and notification of a request for inputting an automatic drive start instruction. Based on the generated signal or command for instructing notification, the fact that the grass mower 1 is at a position that allows entering the travel route corresponding to the hole of the number of the hole of the discovered travel route and the request for inputting the automatic drive start instruction are notified through the display unit 18, the audio output unit 19, or the like. Here, the notification of the number of the hole of the discovered travel route and/or the notification of the request for inputting the automatic drive start instruction may not be performed. A publicly known method can be used for the method of notification, such as display on a display, audio output by audio output means, lighting by a stacked indicating lamp, and vibration. The generated signal and/or command for instructing notification can also be transmitted through the transmission and reception unit 102 to a tablet computer, a computer of a base station, or the like that functions as a notification apparatus separate from the travel route automatic selection apparatus 70. The notification can be displayed on the display of the tablet computer, the computer of the base station, or the like, and/or can be output as sound.

When the user rides and drives the grass mower 1, the notification of the request for inputting the automatic drive start instruction can be performed after the control information generation unit 107 determines that the user is not riding by detecting that the parking brake is applied and/or that a person is not sitting on the driver's seat of the grass mower 1. In this way, the safety of the user can be ensured.

When a touch panel with integrated operation input unit 17 and display unit 18 is used for the notification of the request for inputting the automatic drive start instruction, an automatic drive start button may be displayed on the touch panel.

In addition to the signal and/or the command for instructing the notification, a signal and/or a command for instructing notification of information related to the travel route satisfying the condition may be generated. An example of the information related to the travel route satisfying the condition includes map information of the travel route. A work history of each work target zone may be recorded in the storage unit 108. The work history in the work target zone of the travel route may be displayed, and the necessity of the work of the work target zone may be notified based on the work history.

When the user touches, for example, an automatic drive start button in response to the request for inputting the automatic drive start instruction, the start of automatic travel is instructed to the control apparatus 10 through the operation input unit 17. The grass mower 1 automatically travels based on the current position and the travel route T2 of the second hole 2H stored in the storage unit 108 and discovered by the travel route search unit 125. More specifically, once the grass mower 1 starts traveling from the position for preparing entry, the grass mower 1 corrects the track so as to correct the difference between the current position and the travel route that the grass mower 1 is about to enter. The grass mower 1 enters the travel route T2 on the near side of the work start position $Pls_{T2}$, travels on the travel route T2, and performs the grass mowing work of the second hole 2H.

In S47, if the travel route search unit 125 does not discover the travel route satisfying the condition, the travel route search unit 125 generates a signal and/or a command for notifying that the hole is not the work target hole or that the entry to the travel route is not possible at the current position. Based on the generated signal or command for instructing notification, the fact that the hole is not the work target hole or that the entry to the travel route is not possible at the current position is notified through the display unit 18, the audio output unit 19, or the like.

When the grass mower 1 finishes the grass mowing work and reaches a travel route end position $Pte_{T2}$ (not shown), the grass mower 1 automatically stops. The grass mower 1 switches to a manual drive mode, and the parking brake is applied. The user moves the grass mower 1 to the third hole 3H that is the next work target hole by manual drive, remote control, or the like, and operation similar to the operation in the second hole 2H is performed.

Even if the grass mowing of the third hole 3H cannot be performed due to a situation such as the third hole 3H is used, the travel route corresponding to each work target hole is automatically selected according to the present embodiment if the grass mower 1 is stopped at the entry possible position near the travel route start position of the travel route corresponding to each work target hole. Therefore, the grass mowing work of the work target holes does not have to be performed in a predetermined order, and the grass mowing work of another hole, such as the fifth hole 5H, can be performed first.

When the grass mowing work of the fifth hole 5H is performed first, the grass mowing work of the third hole 3H is performed next. The direction from the second hole 2H to the third hole 3H and the direction from the fifth hole 5H to the third hole 3H are opposite in the cart path CP, and the width of the cart path CP and the width of the grass mower 1 are about the same as described above. Therefore, for use of the travel route T3 (start connection route $J1_{T3}$ thereof) corresponding to the third hole 3H prepared for the grass mower 1 to enter from the direction from the second hole 2H to the third hole 3H, the direction of the grass mower 1 needs to be changed to enter from the direction from the fifth hole 5H to the third hole 3H, and the change in the direction may be burdensome. Therefore, for example, the start connection route $J1_{T3'}$ for entering from the direction from the fifth hole 5H to the third hole 3H can also be recorded in the storage unit 108. According to this configuration, either the start connection route $J1_{T3}$ for entering from the direction from the second hole 2H to the third hole 3H or a start connection route $J1_{T3'}$ for entering from the direction from the fifth hole 5H to the third hole 3H is selected according to the azimuth of the grass mower 1 acquired by the vehicle information reception unit 105 that is azimuth acquirer, and the grass mower 1 can enter the work start position $Pls_{T3}$ after traveling the start connection route $J1_{T3}$ or $J1_{T3'}$ by using the configuration in which it is determined that the condition is not satisfied when the absolute value of the angle of direction of the grass mower 1 with respect to the direction of the tangent line of the corresponding point on the travel route is larger than the predetermined second value.

When the travel route end position of the travel route corresponding to each work target hole is set to a position that allows easily entering the cart path in both left and right directions in generating the travel route, the grass mower 1 can be easily moved to the work target hole of either direction, and this is convenient.

In this way, according to the present embodiment, the work sequence of work target zones can be flexibly changed when a work machine that performs predetermined work while automatically traveling along a predetermined travel route corresponding to each of a plurality of work target zones is used to perform the work.

According to the present embodiment, when a work machine that performs predetermined work while automatically traveling along a predetermined travel route corresponding to each of one or a plurality of work target zones is used to perform the work, and the movement to the work target zone or the movement between the work target zones are performed by manual drive, the arrangement of the work machine for preparing entry so as to allow the work machine to enter the travel route only by forward movement on the near side of the work start position can be more surely performed. The burden of selecting the travel route of the work zone in which the work will be performed can be eliminated, and a mistake can be prevented.

Next, a modified example of the embodiment will be described. The embodiment is simplified in the present modified example, and whether the condition is satisfied is determined based on whether the current position for preparing entry of the grass mower 1 is in a travel start possible area.

The determination of whether the distance between the current position for preparing entry and the travel route is larger than the predetermined first value in the entry availability determination apparatus and method can be considered as determination of whether the current position for preparing entry is positioned closer to the travel route than to curved lines on both sides of the travel route parallel to the travel route at a distance of the predetermined first value from the travel route. Consequently, when a maximum estimated amount of a difference from the target position of manual drive is defined as an estimated maximum difference, the entry availability determination can be simplified by determining whether the current position for preparing entry is positioned in an area having a length at least twice as much as the estimated maximum difference and a width twice as much as the predetermined first value, that is, a travel start possible area surrounded by curved lines on both sides of the travel route parallel to the travel route at a distance of the predetermined first value from a travel route part with a length at least twice as much as the estimated maximum difference and by straight lines orthogonal to the travel route part at the starting point and the end point of the travel route part. Here, the travel start possible area is a rectangle when the travel route part is a straight line, and this enables the user to easily recognize the shape of the travel start possible area.

In step S41 of the present modified example, the travel routes and the operation data of the second hole 2H, the third hole 3H, and the fifth hole 5H that are one or a plurality of holes in which the work will be performed generated by the travel route generation apparatus 3 and the like are recorded in the storage unit 108 of the grass mower 1, and also travel start possible areas SA2, SA3, and SA5 corresponding to the travel routes of one or a plurality of holes in which the work will be performed are recorded in the storage unit 108. In place of this, at the determination, the travel route search unit 125 may generate the travel start possible areas SA2, SA3, and SA5 corresponding to the travel routes T2, T3, and T5 of one or a plurality of holes in which the work will be performed based on the travel routes T2, T3, and T5 of the second hole 2H, the third hole 3H, and the fifth hole 5H recorded in the storage unit 108.

In step S44 of the present modified example, the travel route search unit 125 determines whether the current position for preparing entry of the grass mower 1 is positioned in each of the travel start possible areas SA2, SA3, and SA5 corresponding to the second hole, the third hole, and the fifth hole that are the work target holes recorded in the storage unit 108 to search the travel route in which the current position for preparing entry of the grass mower 1 is positioned in the travel start possible area, from the travel routes T2, T3, and T5 corresponding to the second hole 2H, the third hole 3H, and the fifth hole 5H that are the work target holes.

Although the travel route automatic selection apparatus 70 as an example of the travel route automatic selection system is provided on the grass mower 1 that is a work machine in the above embodiment, part or all of the travel route automatic selection apparatus 70 may be separate from the grass mower 1. For example, a server or a base station separate from the grass mower 1 may include part of the functions of the storage unit 108, which records the travel route part of a predetermined distance from the travel route start position at least between the travel route start position and the work start position of a predetermined travel route corresponding to each work target zone, and the travel route search unit 125. The travel route automatic selection apparatus 70 may be, for example, a tablet computer possessed by the user operating the grass mower 1. In this case, the travel route part of the predetermined distance from the travel route start position between the travel route start position and the work start position, which is necessary for the search of the travel route in which the entry is possible, may be recorded, instead of all of the predetermined travel routes corresponding to a plurality of work target zones as in the above embodiment. When the travel route automatic selection apparatus 70 is formed by using, for example, the tablet computer possessed by the user operating the grass mower 1, it is obvious that a server separate from the tablet computer or the grass mower 1 may have part of the functions of the recording unit, which records the travel route part of the predetermined distance from the travel route start position at least between the travel route start position and the work start position of the predetermined travel route corresponding to each work target zone, and the travel route search unit 125.

Although the search of the travel route in which the entry is possible and the notification of the search result are performed once based on the input of the determination start instruction in the above embodiment, the search of the travel route in which the entry is possible and the notification of the search result may be continuously or intermittently repeated during the manual drive or the remote control. In this case, when the travel route in which the entry is possible is discovered in the remote control, the existence at the position in which the entry to the travel route is possible may be notified, and automatic drive may be performed without the input of the automatic drive start instruction.

Although there are a plurality of work target zones in the above embodiment, there may be only one work target zone. Even if there is only one work target zone, the arrangement of the work machine for preparing entry so as to allow the work machine to enter the travel route only by forward movement on the near side of the work start position can be more surely performed. Further, the burden of selecting the travel route of the work zone in which the work will be performed can be eliminated, and a mistake can be prevented.

A recording medium recording a computer program for implementing the method of the embodiment may be supplied to the travel route generation apparatus 3 or the control apparatus 10 (entry availability determination apparatus 60, travel route automatic selection apparatus 70).

In this case, a computer of the travel route generation apparatus 3 or the control apparatus 10 (entry availability determination apparatus 60, travel route automatic selection apparatus 70) can read and execute the computer program recorded in the recording medium to attain the object of the present invention. Therefore, the computer program read from the recording medium implements the method of the present invention, and the computer program is included in the present invention.

Although the present invention is applied to the grass mower in the example described in the embodiment, the present invention can be applied to an arbitrary work machine, such as farming machines and cleaning machines including a sprinkler, a spreader, a fertilizer distributor, a sower, a soil condition measuring machine, a harvester, a power tiller, a cultivator, and a leveling machine.

Although some embodiments of the present invention have been described for illustration, the present invention is not limited to these, and it should be apparent to those skilled in the art that the modes and the details can be changed and modified in various ways without departing from the scope and the spirit of the present invention.

REFERENCE SIGNS LIST

1 . . . grass mower
10 . . . control apparatus
11 . . . vehicle speed sensor
12 . . . azimuth angular-velocity sensor
13 . . . drive control unit
15 . . . GPS antenna
16 . . . communication antenna
17 . . . operation input unit
18 . . . display unit
19 . . . audio output unit
101 . . . GPS reception unit
102 . . . transmission and reception unit
105 . . . vehicle information reception unit
106 . . . drive instruction unit
107 . . . control information generation unit
108 . . . storage unit
109 . . . removable recording medium interface unit
112 . . . main control unit
121 . . . work complete and incomplete position recording unit
122 . . . corresponding point decision unit
123 . . . determination information generation unit
124 . . . notification signal and command generation unit
125 . . . travel route search unit
2 . . . base station
21 . . . GPS reception apparatus
22 . . . transmission and reception apparatus
25 . . . GPS antenna
26 . . . communication antenna
3 . . . travel route generation apparatus
30 . . . control unit
31 . . . operation input unit
32 . . . display unit
33 . . . storage unit
34 . . . removable recording medium interface unit
35 . . . transmission and reception unit
301 . . . zone setting unit
302 . . . route generation unit
303 . . . operation setting unit
304 . . . main control unit
40 . . . removable recording medium
50 . . . periphery of work target zone
51 . . . periphery of entry prohibited zone
60 . . . entry availability determination apparatus
70 . . . travel route automatic selection apparatus
90 . . . work complete position (work incomplete position)
91 . . . (current) position for preparing entry
92 . . . nearest point
93 . . . point at distance of preset third value d3 from nearest point 92 in traveling direction of grass mower 1 in travel route

The invention claimed is:

1. An entry availability determination system comprising:
a detector that detects a current position of a work machine that performs predetermined work while traveling a work target zone along a predetermined travel route; and
a determination information generation unit that generates determination information indicating whether entry is possible by determining whether the work machine can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route.

2. The entry availability determination system according to claim 1, further comprising:
   a storage unit recording the travel route;
   a corresponding point decision unit that decides a corresponding point that is a point on the travel route recorded in the storage unit corresponding to the current position for preparing entry detected by the detector of the work machine; and
   wherein the determination information generation unit determines that the entry is impossible if a distance between the current position for preparing entry and the corresponding point is larger than a predetermined first value, and generates determination information indicating whether the entry is possible, and
   wherein the predetermined first value is set in advance by considering at least steering performance of the work machine and a desired distance from a corresponding point to a point that the work machine enters the travel route.

3. The entry availability determination system according to claim 2, wherein the detector further detects a direction of the work machine, and
   wherein the determination information generation unit determines that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and generates the determination information indicating whether the entry is possible.

4. The entry availability determination system according to claim 2, further comprising a work complete position recording unit that records the work complete position in the storage unit,
   wherein the determination information generation unit determines that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position.

5. The entry availability determination system according to claim 2, further comprising a work complete and incomplete position recording unit that records the work complete position and the work incomplete position in the storage unit,
   wherein the determination information generation unit determines that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position or the work incomplete position.

6. The entry availability determination system according to claim 2, wherein the corresponding point is a nearest point that is a point on the travel route recorded in the storage unit nearest to the current position for preparing entry detected by the detector of the work machine.

7. The entry availability determination system according to claim 2, wherein the corresponding point is a work complete side nearest point that is a point on the travel route recorded in the storage unit nearest to the current position for preparing entry detected by the detector of the work machine, on the opposite side of the traveling direction of the work machine with respect to the work complete position or the work incomplete position.

8. The entry availability determination system according to claim 1, further comprising a notification signal and command generation unit that generates a signal and/or a command for instructing notification indicating that the entry is possible and/or the entry is impossible based on the determination information.

9. A work machine control system comprising:
   a controller that controls a travel driving mechanism comprised in the work machine by outputting a travel control signal for the work machine to travel the travel route based on at least the current position of the work machine that travels the work target zone and the travel route recorded in the storage unit; and
   the entry availability determination system according to claim 1.

10. A work machine comprising a travel driving mechanism that drives travel of the work machine based on the travel control signal output from the work machine control system according to claim 9.

11. An entry availability determination method comprising the steps of;
    detecting a current position of a work machine that performs predetermined work while traveling a work target zone along a predetermined travel route; and
    generating determination information indicating whether entry is possible by determining whether the work machine can enter from a current position for preparing entry of the work machine only by forward movement along an entry route formed so that the work machine enters at an entry position in a same direction as a traveling direction when the work machine travels the travel route, at the entry position positioned on an opposite side of the traveling direction of the work machine with respect to a work complete position or a work incomplete position on the travel route, when the work machine gets out of the travel route.

12. The entry availability determination method according to claim 11, further comprising a step of deciding a corresponding point that is a point on the travel route corresponding to the current position for preparing entry detected by the step of detecting the current position of the work machine,
    wherein in the step of generating determination information, it is determined that the entry is impossible if a distance between the current position for preparing entry and the corresponding point is larger than a predetermined first value, and
    wherein the predetermined first value is set in advance by considering at least steering performance of the work machine and a distance from a desired corresponding point to a point that the work machine enters the travel route.

13. The entry availability determination method according to claim 12, wherein in the step of detecting, a direction of the work machine is further detected, and wherein in the step of generating the determination information, it is determined that the entry is impossible if the distance between the current position for preparing entry and the corresponding point is larger than the predetermined first value or if an absolute value of an angle of the direction of the work machine with respect to a direction of a tangent line at the corresponding point on the travel route is larger than a predetermined second value, and the determination information indicating whether the entry is possible is generated.

14. The entry availability determination method according to claim 12, further comprising:

recording the work complete position; and determining that the entry is impossible if a point at a distance of a third value, which is set by considering a margin distance to the desired distance from the corresponding point to the point that the work machine enters the travel route, in the traveling direction of the work machine in the travel route is positioned on the side of the traveling direction of the work machine with respect to the work complete position.

15. The entry availability determination method according to claim 12, further comprising the steps of:

recording the work complete position and the work complete position; and determining that the entry is impossible if a point at a distance of a third value, which is set by considering a margin distance of the distance from the desired corresponding point to the point that the work machine enters the travel route, in the traveling direction of the work machine in the travel route is positioned on the side of the traveling direction of the work machine with respect to the work complete position or the work incomplete position.

16. The entry availability determination method according to claim 12, wherein the corresponding point is a nearest point that is a point on the travel route nearest to the current position for preparing entry detected by the detector of the work machine.

17. The entry availability determination method according to claim 12, wherein the corresponding point is a work complete side nearest point that is a point on the travel route recorded in the storage unit nearest to the current position for preparing entry detected by the detector of the work machine, on the opposite side of the traveling direction of the work machine with respect to the work complete position or the work incomplete position.

18. The entry availability determination method according to claim 11, further comprising a step of generating a signal and/or a command for instructing notification indicating that the entry is possible and/or the entry is impossible based on the determination information.

19. A computer-readable recording medium recording a computer program for causing a computer to execute the entry availability determination method according to claim 11.

* * * * *